(12) United States Patent
Shintani et al.

(10) Patent No.: US 6,255,618 B1
(45) Date of Patent: Jul. 3, 2001

(54) METHOD AND APPARATUS FOR SPOT WELDING A WORK HAVING A PLURALITY OF WELDING MATERIALS PLACED ON TOP OF EACH OTHER BY BORING A HOLE TO RELEASE VAPORS

(75) Inventors: Toshiya Shintani; Yohsuke Imai; Yoshitaka Niigaki; Iwao Kurokawa, all of Kanagawa; Kengo Kamiya; Hideto Uematsu, both of Aichi, all of (JP)

(73) Assignees: Komatsu Ltd., Tokyo; Toyota Shatai Kabushiki Kaisha, Aichi, both of (JP)

( * ) Notice: Subject to any disclaimer, the term of this patent is extended or adjusted under 35 U.S.C. 154(b) by 0 days.

(21) Appl. No.: 09/355,800

(22) PCT Filed: Jan. 28, 1998

(86) PCT No.: PCT/JP98/00340

§ 371 Date: Aug. 3, 1999

§ 102(e) Date: Aug. 3, 1999

(87) PCT Pub. No.: WO98/34752

PCT Pub. Date: Aug. 13, 1998

(30) Foreign Application Priority Data

Feb. 5, 1997 (JP) .................................................... 9-023038

(51) Int. Cl.$^7$ .................................................. B23K 10/00
(52) U.S. Cl. ............................... 219/121.46; 219/121.45; 219/121.59; 219/137 R; 219/137.2
(58) Field of Search ........................... 219/121.47, 76.15, 219/76.16, 121.45, 121.46, 130.01, 130.31, 137.7, 137.71, 137.2

(56) References Cited

U.S. PATENT DOCUMENTS 4,527,045 * 7/1985 Nakajima et al. ............... 219/130.31
5,728,991 * 3/1998 Takada et al. .................. 219/121.46

FOREIGN PATENT DOCUMENTS 715172    3/1995  (JP) .
825049    1/1996  (JP) .

* cited by examiner

*Primary Examiner*—Mark Paschall
(74) *Attorney, Agent, or Firm*—Gallagher & Lathrop; David N. Lathrop

(57) ABSTRACT

A plasma arc welding for effectively letting gases of low boiling point substances for coating a steel sheet escape, ensuring the escape of a molten metal into gaps between the steel sheets and eventually accomplishing satisfactory plasma arc welding. A hole (31) is first bored in an upper sheet (21)(or both upper and lower sheets (21 and 22)) quickly by using a plasma arc (20) having greater power than an appropriate welding value, and a vapor of coating substances is allowed to escape through the hole (31). Subsequently, power of the plasma arc (20) is lowered to the appropriate welding value, and the upper sheet (21) and the lower sheet (22) are welded together while a filler (9) is being supplied to fill the hole (31) and the gap (23). While boring is made or immediately after boring is finished, the size of the gap (23) is measured on the basis of the plasma arc voltage, and the feed quantity of the filler (9) is controlled in accordance with the size of the gap (23).

33 Claims, 20 Drawing Sheets

METHOD AND APPARATUS FOR SPOT WELDING A WORK HAVING A PLURALITY OF WELDING MATERIALS PLACED ON TOP OF EACH OTHER BY BORING A HOLE TO RELEASE VAPORS

TECHNICAL FIELD

The present invention relates to plasma arc welding, and more particularly to a plasma arc welding technology suitable for welding a metal, the surface of which is coated with a substance, which has a boiling point that is lower than a melting point of a base metal.

BACKGROUND ART

Plasma arc welding, for example, plasma arc spot welding is being utilized in a variety of fields. This is because plasma arc welding enables metal workpieces laid one on top of the other to be welded together from one side, which is advantageous in that it enables the welding of an intricately-shaped workpiece, and a large workpiece.

However, conventional plasma arc welding proves problematic when welding a metal coated on a surface with a substance that has a lower melting point than a melting point of a base metal, such as galvanized sheet steel, in that satisfactory welding results cannot be obtained because a surface coating material vaporizes, and a vapor thereof penetrates a molten pool of a weld causing an explosion, and/or leaving a hole in a weld.

To solve for this problem, the applicant of the present case proposed in Japanese Patent Application No. 6-061138 a welding method, wherein 2 steps of vapor escape and main welding are performed consecutively by adjusting the power of a plasma arc. That is, initially, using a relatively high power plasma arc, a through-hole is bored in at least one of the steel sheets to be welded together, and a vapor of a coating material is allowed to escape via this through-hole. Next, the power of a plasma arc is lowered to an appropriate level, and two steel sheets are welded.

In the welding method of Japanese Patent Application No. 6-061138, when there is a gap between 2 steel sheets to be welded, because a molten metal is expended in the gap, there are cases in which a vapor escape hole cannot be flattened by subsequent welding steps, or high weld strength cannot be achieved, or, when a gap is large, welding itself cannot be performed. According to a test of the inventors, it was determined that welding substantially cannot be performed when a gap between steel sheets exceeds around 0.2mm.

Therefore, an object of the present invention is, in plasma arc welding, to make it possible to achieve satisfactory welding even when there is a gap between welding materials.

An additional object of the present invention is, in plasma arc welding, to make a vapor of a low-boiling-point material coating a welding material effectively escape, and to make it possible to achieve satisfactory welding even when there is a gap between welding materials.

And yet an additional object of the present invention is, in plasma arc welding, make it possible to measure a gap between welding materials automatically.

DISCLOSURE OF THE INVENTION

In plasma arc welding in accordance with a first aspect of the present invention, there is performed a boring step for boring a hole in work, and subsequent thereto, a plasma arc is controlled so as to perform a main welding process for welding the work, and a filler is supplied to the plasma arc at the least when a main welding process is performed.

According to the plasma arc welding thereof, since a vapor of a coating material can effectively escape via a hole bored in the work, and in a main welding process of subsequent thereto, a molten filler is supplied to a hole, satisfactory welding results can be obtained by effectively filling a gap and a hole with filler. Furthermore, a vapor escape hole can either be bored in only one, or can be bored in all of a plurality of welding materials of the work.

In a preferred embodiment, a filler is not supplied in a boring step, but rather a filler is supplied only at a main welding process. This is so a hole can be bored rapidly.

A filler can be supplied in accordance with either a previously-determined feed quantity or feed time. For example, a filler feed quantity or feed time which conforms to an anticipated maximum gap size is set beforehand, and a filler can be supplied in accordance therewith. Or, a filler feed quantity or feed time can be determined in accordance with the size of a gap between pieces of the work each time welding is performed, and filler can be supplied in accordance therewith.

And as well as filler feed quantity or feed time, another welding condition (for example, arc current, arc voltage, plasma gas flow, plasma gas type, shielding gas flow, shielding gas type, standoff, or the like) can be changed in accordance with the size of the gap. In that case, the various welding conditions to be adjusted can also be collectively determined in accordance with the size of the gap (for example, selecting one set from among a variety of previously-prepared sets of welding conditions that correspond to gap sizes).

When welding conditions are determined in accordance with gap size, it is necessary to measure some physical value or another related to gap size to find out the size of the gap. For example, a plasma arc voltage value at the end of boring, or a rise rate of a plasma arc voltage during boring can be cited as a physical value therefor. In the case of the latter, the above-mentioned measurement and condition determination can be processed in parallel with boring.

When measuring the rise rate of the arc voltage to find out the size of the gap, a plurality of arc current pulses can be repeatedly made to flow during boring. And then, if an arc voltage is measured at individual points in time of the series of current pulses, and the rise rate thereof is calculated, since this rise rate constitutes a value that favorably reflects the gap size, it is relatively easy to find out the size of the gap.

When implementing this method using current pulses, the shielding gas in the boring process can be controlled so as to be slightly less than same in the main welding process. By so doing, because the change in an arc voltage rise rate in accordance with a gap size becomes large, it becomes easy to accurately find out the size of the gap.

In general, with plasma arc welding, the change of an arc voltage resulting from electrode wear during a single welding operation is so small that it can be ignored, enabling a stable arc voltage to be achieved during welding. Further, in plasma arc welding, because a filler must be provided separate from an electrode, the control of a filler feed quantity can be performed independent of the control of a plasma arc, which is a heat source. Therefore, in plasma arc welding, gap size can be accurately grasped on the basis of arc voltage, a filler feed quantity can be optimally controlled in accordance with that gap size, and as a result thereof, satisfactory welding results can be obtained.

In plasma arc welding according to a second aspect of the present invention, a filler feed quantity or feed time is determined in accordance with the size of a gap between workpieces, and a plasma arc is generated for welding the workpieces, and then, a filler is supplied to the plasma arc in accordance with the determined feed quantity or feed time.

According to the plasma arc welding thereof, because a filler of an amount that accords with the gap size between pieces of work is supplied to a welding location during welding, the gap is effectively filled up by the filler, making it possible to obtain satisfactory welding results.

When this plasma arc welding is performed on work coated with a low-boiling-point substance, it is desirable to bore a hole for vapor escape (using either a plasma arc, or a drill, or some other boring machine) at the welding location of the work either before welding or during welding. In this case, according to this plasma arc welding, the gap and hole are filled up by the filler, enabling satisfactory welding results to be obtained. Further, when welding pieces of work not coated with a low-boiling-point substance, there is no need to bore a vapor escape hole, but in this case as well, since a filler of an amount that accords with a gap size can be supplied to a molten pool at the welding location in accordance with this plasma arc welding, satisfactory welding can be accomplished by filling in the gap.

In this plasma arc welding, when a plasma arc is used to bore a hole in the work prior to welding, since boring is performed quickly, rather than supplying filler in this boring process, it is possible to supply filler only when welding the work subsequent thereto.

In a plasma arc process according to a third aspect of the present invention, a plasma arc is generated for boring a hole in a workpiece, and a filler feed quantity or feed time is determined in accordance with the size of a gap between pieces of work for filling up this hole with filler.

This plasma arc process can be used as a front-end process which is carried out on work prior to performing welding (welding itself can be either plasma arc welding, or some other type of welding).

According to this plasma arc process, a hole is bored in work by a plasma arc, and a vapor of a coating material can escape, and furthermore, a filler feed quantity or feed time can be determined for filling in this hole and a gap. Therefore, when welding the work subsequent thereto, a filler can be supplied in accordance with this determined feed quantity or feed time. If subsequent welding is performed in this manner, satisfactory welding results can be obtained by filling in a gap and a hole with filler.

As a method for finding out the size of a gap, it is possible to utilize a method for measuring the state of a plasma arc, for example, a method for measuring a voltage value of a plasma arc after a hole has been bored in a workpiece, or a method for measuring a rate of change of a plasma arc voltage while boring a hole in a workpiece. When using the latter method in particular, the ability to carry out simultaneously in parallel a process for boring a hole using an arc, and a process for determining a filler feed quantity that accords with a gap size facilitates starting a welding process immediately after a hole has been bored.

In the control of plasma arc welding according to a fourth aspect of the present invention, the state of a plasma arc being used to bore a hole in work is measured, and based on the measurement results thereof, welding conditions for welding the work are determined.

According to this control, welding conditions can be adjusted in accordance with the state of a plasma arc, which is boring a hole. In a plasma arc state, because there are factors, such as the arc voltage, for example, which change in accordance with the size of the gap between workpieces, it becomes possible to adjust welding conditions in accordance with gap size. For example, it becomes possible to adjust, in accordance with a gap size, the feed quantity or feed time of a filler for filling in a hole and gap.

According to a fifth aspect of the present invention, there is provided a technique for accurately detecting a gap between workpieces using a plasma arc. A plasma arc is supplied to the workpieces so as to bore a hole in a workpiece, and the arc voltage of the plasma arc is measured at this time. And then, based on changes, preferably a rise rate, in the measured arc voltage, either the size of the gap between the workpieces, or related data corresponding to gap size (for example, conditions for satisfactorily welding the workpieces) are determined.

A plasma arc can be supplied in a mode of a plurality of repeating current pulses, which preferably have a prescribed current value. The size of a gap between workpieces can be accurately detected from the rise rate of an arc voltage corresponding to these plurality of current pulses. When performing this measurement, the smaller the flow of the shielding gas, the more prominent the rise rate of the arc voltage.

This kind of gap detection can be performed using a computer. A computer program therefor can be either installed or loaded into a computer via various media, such as disk storage, semiconductor memory, or a telecommunications network.

Other objects of the present invention will be made clear in the subsequent explanations.

BEST MODE FOR CARRYING OUT THE INVENTION

Figure 1:
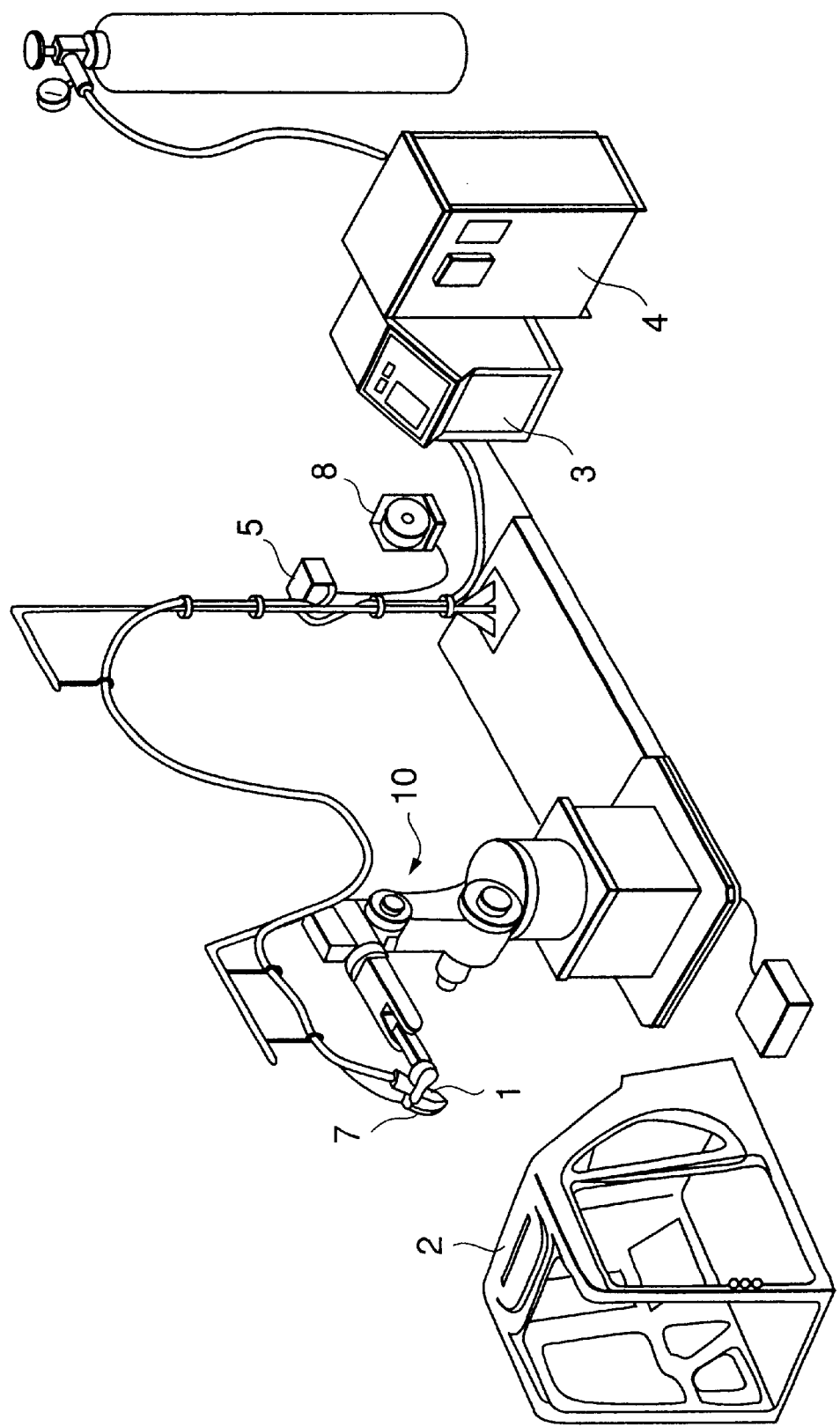
FIG. 1 is an oblique view showing an overall constitution of an embodiment of a plasma arc welding apparatus of the present invention mounted to a robot.

FIG. 1 shows an overall constitution of an embodiment of a plasma arc welding apparatus of the present invention mounted to a robot.

A plasma torch 1 is mounted to the end of the arm of a robot 10. The movements and attitude of the robot 10 are controlled by a robot controller 4, and work 2 can be welded from all directions. A welding source 3 supplies the plasma torch 1 with the electrical power, plasma gas, and shielding gas required for performing plasma arc welding, and also controls welding conditions, comprising plasma gas flow, shielding gas flow, welding current value, welding time, and so forth. A high frequency unit 5 generates high frequency power for causing dielectric breakdown when generating a pilot arc. A gas flow switch 6 is disposed at the gas inlet of the plasma torch 1. The gas flow switch 6 switches the flow of a plasma and shielding gas to large/small in response to a command from the welding source 3. A filler nozzle 7 is disposed in the proximity of the tip of the plasma torch 1. A wire-shaped filler is fed out from a filler feeding device 8, and supplied to the front side of the torch 1 via the filler nozzle 7. The filler feeding device 8 feeds out and/or stops the filler in response to a command from the welding source 3.

Figure 2:
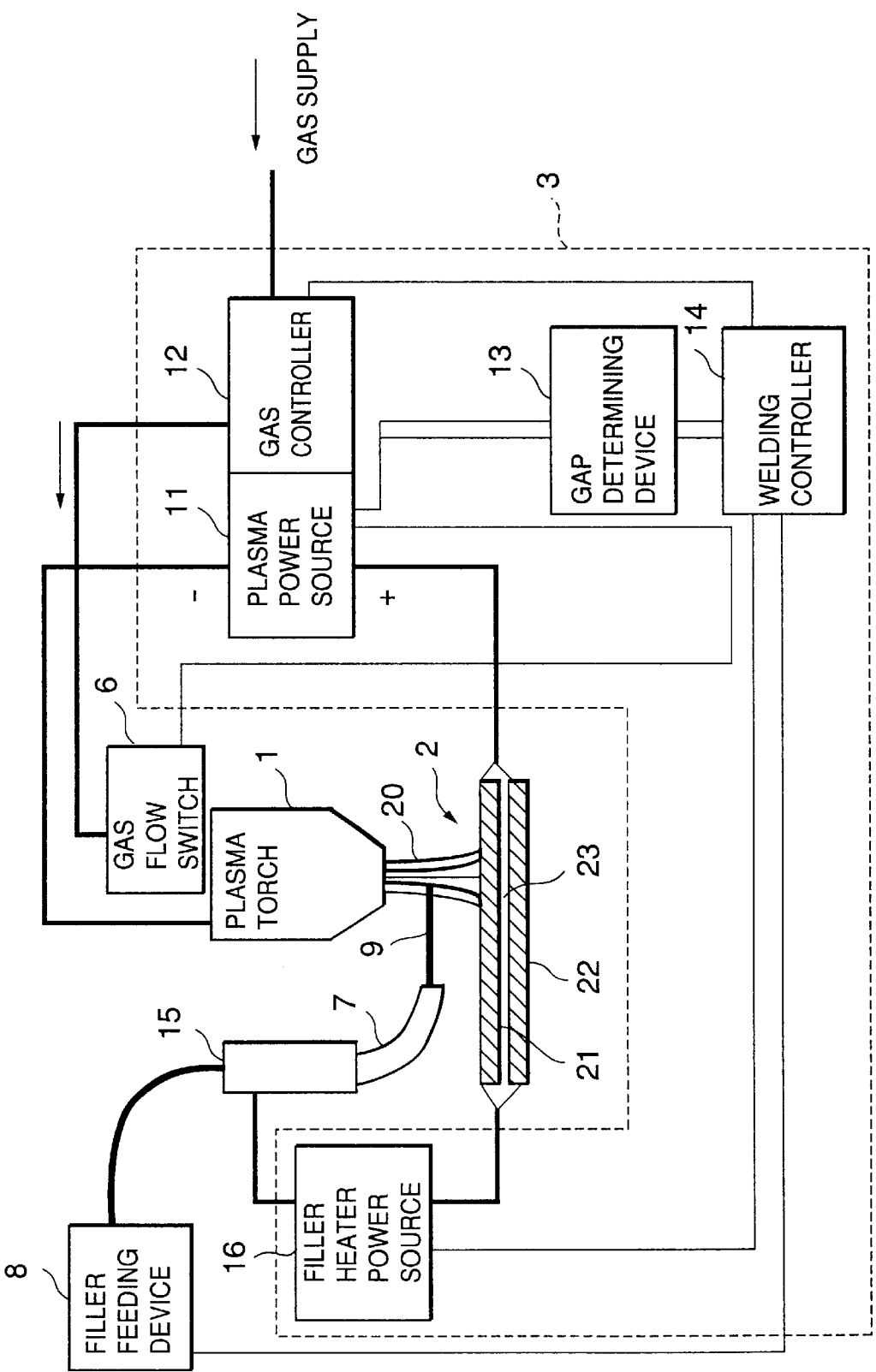
FIG. 2 is a block diagram showing a constitution of a welding source 3, together with related elements.

FIG. 2 shows a constitution of a welding source 3, together with elements related thereto.

The welding source 3 comprises a gas controller 12 for supplying a plasma gas and a shielding gas of a controlled pressure to the plasma torch 1. The flow of the plasma gas and shielding gas, respectively, can be switched in two stages, large and small, by switching a open-close valve inside the gas flow switch 6. The gas flow switch 6 is disposed in a location, which is as close as possible to the torch 1 (for example, the torch 1 gas inlet) so that there is no substantial time lag between the switching operation of the gas flow switch 6 and the actual flow change of the gas jet from the torch 1.

The welding source 3 also comprises a plasma power source 11 for supplying to the plasma torch 1 the power (voltage and current) required to control the generation and maintenance of a plasma arc 20, and a gap determining device 13 for measuring the size (space) of a gap 23 between 2 steel sheets 21, 22 of the work 2. The plasma power source 11 performs constant current control during welding so as to make a supply current (plasma arc 20 current) identical to a target value (as will be explained hereinbelow, a current target value changes in accordance with a process). The gap determining device 13 monitors the generation voltage of the plasma power source 11 during welding (that is, the voltage between the torch 1 and the work 2, that is, the voltage drop of a plasma arc 20), and determines the size of a gap 23 between steel sheets 21, 22 in accordance with a method which will be described hereinbelow.

A filler heater 15 is provided in the proximity of the filler nozzle 7 for heating a filler 9 beforehand. A power source 16 for the filler heater 15 is included in the welding source 3. Heating a filler 9 beforehand has the advantage of enhancing welding speed by shortening the time it takes for a filler 9 to melt after entering inside a plasma arc 20.

The welding source 3 also comprises a welding controller 14 for controlling the various elements described above. The welding controller 14 controls the various above-described elements by a procedure such as that explained hereinbelow, but the control operation thereof comprises driving and stopping the gas controller 12; furnishing a flow switching command to the gas flow switch 6; driving and stopping the filler feeding device 8; driving and stopping a power source 16 for the filler heater; driving and stopping the plasma power source 11; furnishing a current target value to the plasma power source 11; monitoring the supply voltage of the plasma power source 11, and acquiring welding conditions, such as filler feed quantity, and welding time, which accord with the size of a gap 23 determined by the gap determining device 13; and monitoring the supply voltage of the plasma power source 11, and determining a timing change of a welding process.

Figure 3:
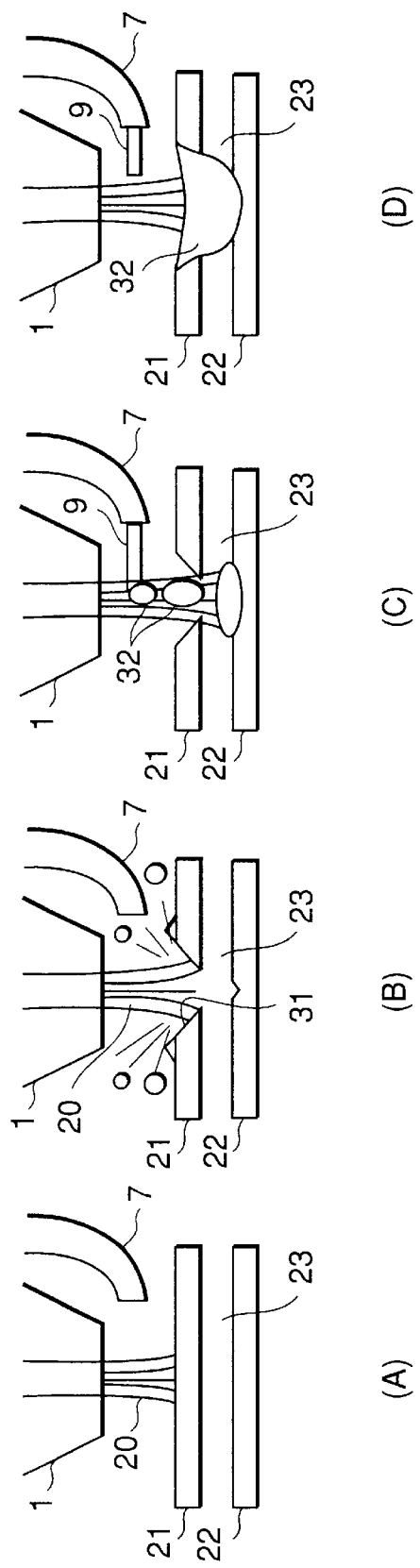
FIG. 3 is a schematic diagram showing a flow of an embodiment of a plasma arc welding method according to the present invention.

FIG. 3 shows a flow of an embodiment of a plasma arc welding method in accordance with the present invention.

First, as shown in FIG. 3(A), a plasma arc 20 is ignited at a location where welding is to be performed, and next, as shown in FIG. 3(B), using a plasma arc 20 of a relatively high power, a hole 30 for vapor escape is bored in a steel sheet (hereinafter referred to as the upper sheet) 21 nearest the torch 1. To increase the power of the plasma arc 20 at this time, either one or both of the plasma current and plasma gas flow are controlled to a high value. When using the arc 20 on the upper sheet 21, the spot portion thereof melts, and as shown in the figure, is either blown off or builds up in the area surrounding the hole 31, and then, the hole 31 passes through the upper sheet 21. Since a high-power plasma arc 20 is utilized, a hole 31 can be bored in a short time. When the hole 31 passes through the upper sheet 21, because the steel sheet farthest from the torch 1 (hereinafter referred to as the lower sheet) 22 is also directly heated by the plasma arc 20, the heating of the lower sheet 22 is rapid, and melting is also performed with certainty. When there is a low-boiling-point coating material on the surface of either the upper sheet 21 or the lower sheet 22, a vapor of the coating material escapes to the outside via the hole 31 bored in the upper sheet 21.

When the hole 31 passes through the upper sheet 21, the power of the plasma arc 20 is immediately lowered to a value appropriate for welding (that is, the plasma current and plasma gas flow are controlled to values suitable for welding), and the upper sheet 21 and lower sheet 22 are appropriately melted and welded (this operation is referred to hereinafter as 'main welding'). At this time, as shown in FIG. 3(C), a filler 9 is fed into the plasma arc 20. By so doing, the filler 32, which is melted by the arc heat is supplied to the welding spot, and fills in the hole 31 and the gap 23 between the steel sheets. Finally, as shown in FIG. 3(D), the hole 31 is filled back in, the gap 23 is also filled, and a weld is established between the steel sheets 21, 22. At this stage, the filler 9 is retracted outside the plasma arc 20, and the feeding thereof is stopped, and next, the plasma arc 20 is extinguished. With this, one welding operation is complete.

The feed quantity of filler 9 required to completely fill in a hole 31 is determined in accordance with such factors as the thickness of the upper sheet 21, the size of the hole 31, and the size of the gap 23. Of these, the factor that changes for each welding operation is ordinarily the size of a gap 23. It is desirable that no indentation remain where the hole 31 was following completion of welding, and as one method for achieving this, a one-weld filler feed quantity is set by tailoring it to a maximum gap 23 value estimated beforehand (In a welding apparatus that uses this method, the gap determining device 13 shown in FIG. 2 is not necessary.). This method is simple, and ensures that a hole 31 can be filled in, but when the gap 23 is smaller than the estimated maximum value, because a bump inevitably remains on the weld, the appearance is not satisfactory. Accordingly, as another method, it is also possible to measure the size of the gap 23 each welding operation (using, for example, the gap determining device 13 shown in FIG. 2), and to appropriately control the filler feed quantity in accordance with the measured value (this method will be explained in detail hereinbelow). Furthermore, as a method for adjusting the filler feed quantity, there is a method, wherein the feed rate of the filler is maintained constant in the main welding process shown in FIG. 3(C), and the feeding time-length thereof is adjusted. When this adjustment method is used, there are cases, wherein the time-length of the main welding process must be adjusted in accordance with the filler feeding time-length.

Figure 4:
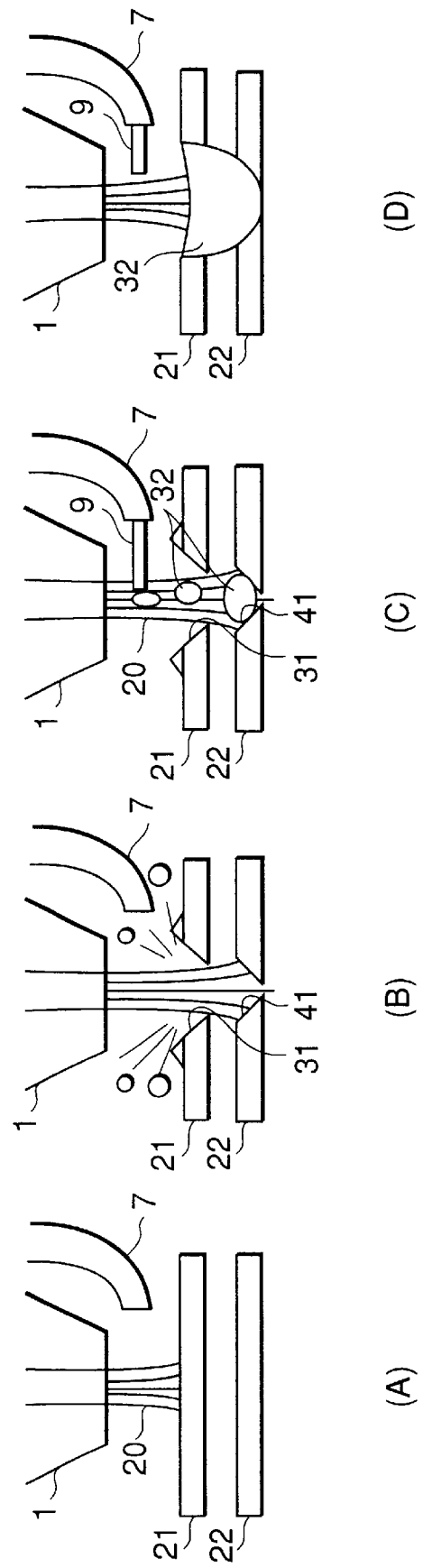
FIG. 4 is a schematic diagram showing a flow of another embodiment of a plasma arc welding method according to the present invention.

FIG. 4 shows another embodiment of a welding method of the present invention.

In the method shown in FIG. 4, the power of the plasma arc in the initial hole-boring stage is set higher than the welding method of FIG. 3, and as shown in FIG. 4(B), a vapor escape hole 41 is made to pass through the lower sheet 22 as well. Accordingly, a vapor of a coating material can efficiently escape from two holes 31, 41, an upper and a lower. Thereafter, the plasma arc power is lowered to an appropriate value, and as shown in FIG. 4(C), welding is performed as filler 9 is supplied. Finally, as shown in FIG. 4(D), a molten filler 32 is completely filled in from the lower hole 41 to the upper hole 31.

In the method of FIG. 4 as well, it is possible to utilize either of the 2 methods described above for setting a filler feed quantity.

Figure 5:
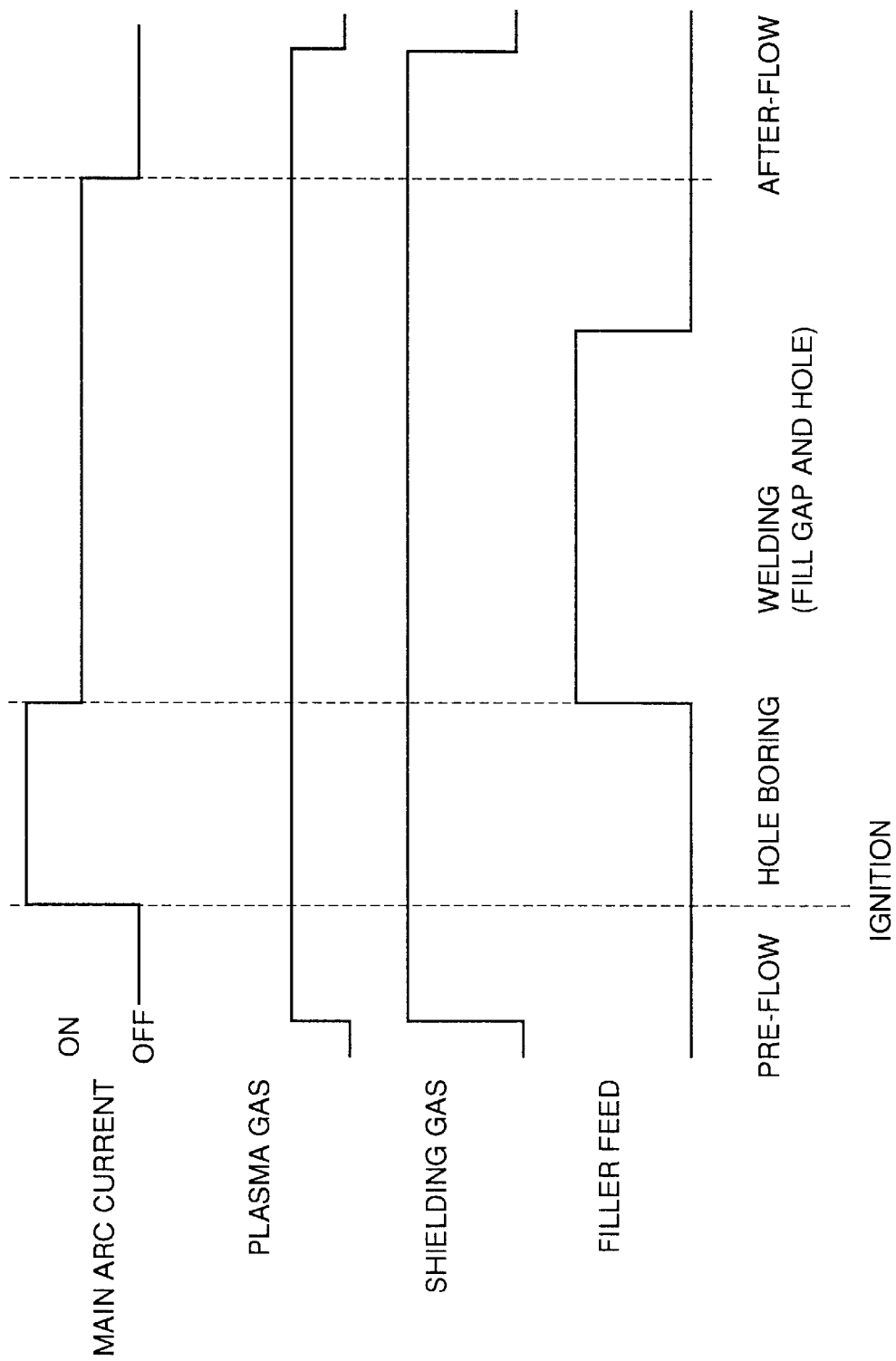
FIG. 5 is a timing chart showing an embodiment of a control method for plasma current, plasma gas flow, shielding gas flow, and filler feed when carrying out the welding method shown in either FIG. 3 or FIG. 4.

FIG. 5 shows an embodiment of a control method of a plasma current, plasma gas flow, shielding gas flow, and filler feed when performing the welding method shown in either FIG. 3 or FIG. 4.

A single welding operation constitutes a pre-flow process, wherein a gas is made to flow and an appropriate atmosphere is prepared prior to arc ignition; a hole-boring process, wherein a vapor escape hole is made to pass through a steel sheet using a high-power arc; a main welding process, wherein a hole and gap are filled in by a filler, and welding is carried out using an arc of an appropriate power; and an after-flow process, wherein oxidation of a weld is prevented by making a gas flow even after the arc is extinguished.

In the control method shown in FIG. 5, a plasma gas flow and a shielding gas flow are respectively maintained at prescribed constant values throughout the above-described 4 processes. A plasma current (In this explanation, plasma current refers to the current of the main arc used substantially on a steel sheet, exclusive of a pilot arc.) is controlled to a relatively high value in a hole-boring process, and in the main welding process of subsequent thereto, is controlled to a lower value appropriate for welding. Filler feed is performed only in the main welding process by a time-length that accords with a set filler feed quantity. As explained above, by increasing the main arc current in the hole-boring process, the power of the plasma arc becomes larger, making it possible to bore a vapor escape hole at high speed.

Figure 6:
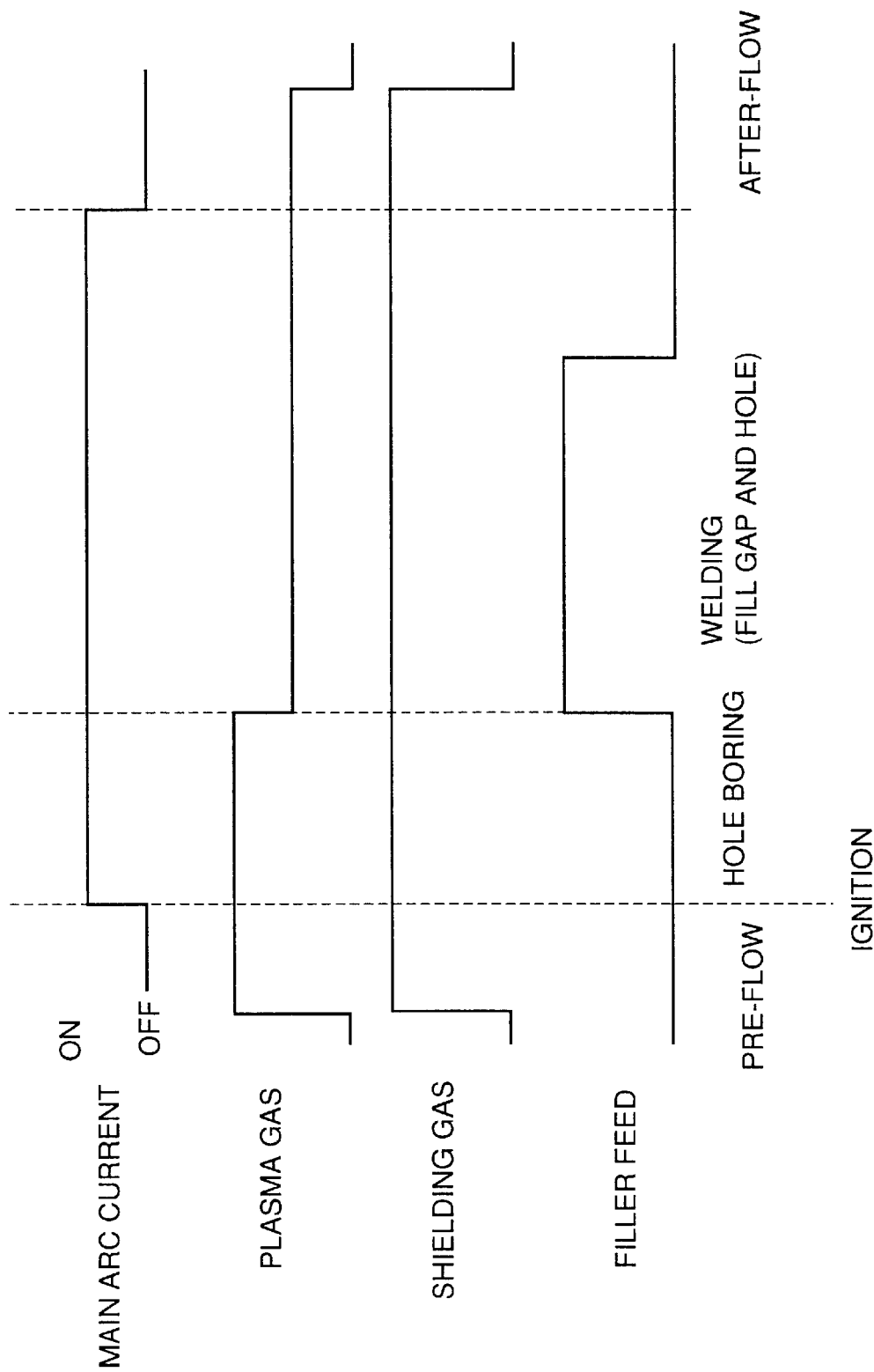
FIG. 6 is a timing chart showing another embodiment of a control method for plasma current, plasma gas flow, shielding gas flow, and filler feed when carrying out the welding method shown in either FIG. 3 or FIG. 4.

FIG. 6 shows another embodiment of a control method of a plasma current, plasma gas flow, shielding gas flow, and filler feed.

In this control method, the main arc current is maintained at a constant value, and a large plasma arc power is obtained in a hole-boring process by increasing the plasma gas flow instead. If the plasma gas flow is increased from the pre-flow process of prior to the hole-boring process, the start of the hole-boring process is smooth. To increase arc power in the hole-boring process, it is also possible to increase the plasma current as in the method of FIG. 5, and to increase the plasma gas flow as in FIG. 6 at the same time.

When implementing the control method shown in either FIG. 5 or FIG. 6 using the welding apparatus shown in FIG. 2, control of the plasma current can be performed by adjusting a target current value relative to the plasma power source 11, control of plasma gas flow and shielding gas flow can be performed by adjusting the pressure of the gas controller 12, and switching the gas flow switch 6, and control of filler feed can be performed by the driving/stopping of the filler feeding device 8. These operations are performed by a computer (not shown in the figure) inside the welding controller 19 furnishing commands to the plasma power source 11, gas controller 12, gas flow switch 6, and filler feeding device 8 in accordance with a program.

Figure 7:
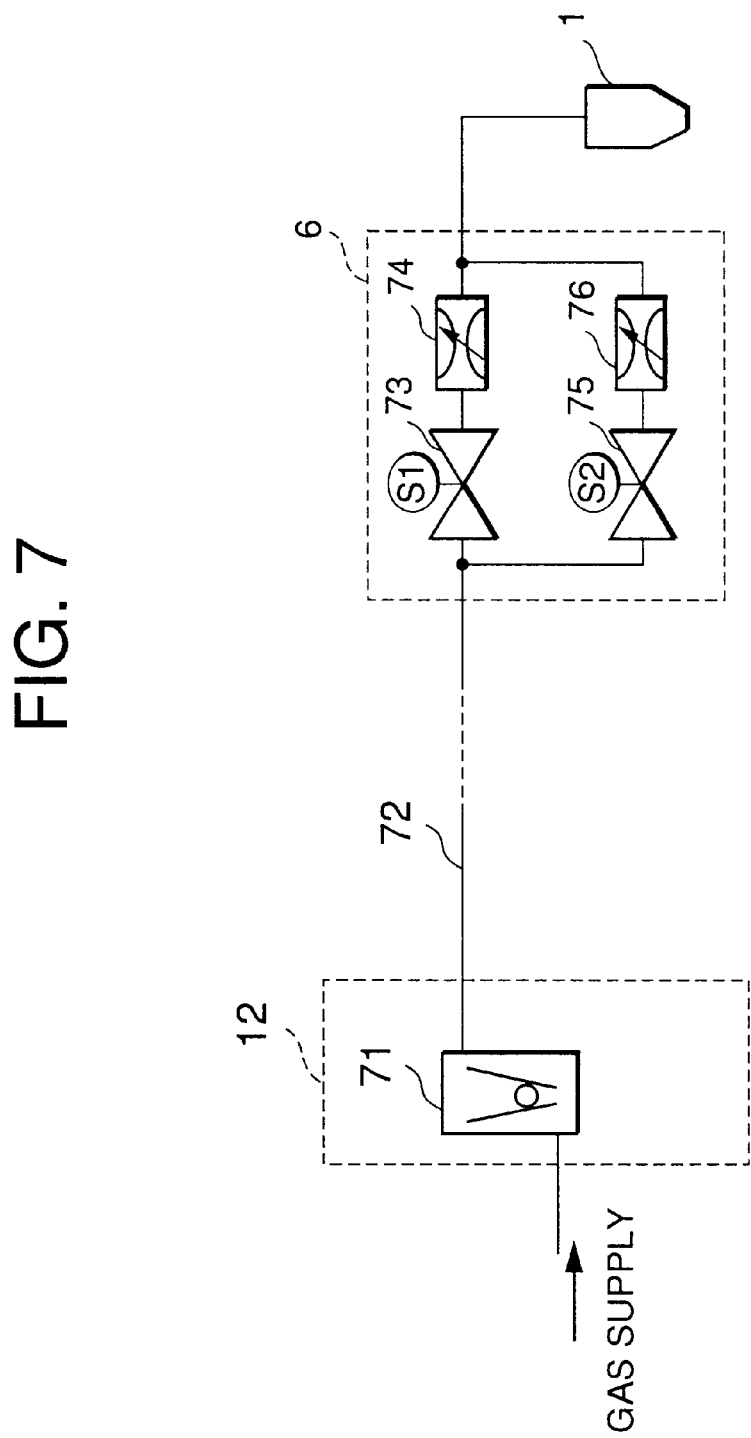
FIG. 7 is a piping diagram showing an example of a constitution for switching a gas flow.

In the control method of FIG. 6, the magnitude plasma gas flow is switched. FIG. 7 shows one example of a specific constitution for carrying out this kind of gas flow switching.

The gas controller 12 shown in FIG. 2 supplies a gas of a specific constant pressure to a gas flow switch 6 via a gas pipe 72. The gas controller 12 comprises a gas flowmeter 71. The gas flow switch 6, as shown in FIG. 1, is disposed in a location as close as possible to the torch 1, and in accordance therewith, a flow of gas emitted from the nozzle of the torch 1 can be rapidly changed without a substantial time lag. Inside the gas flow switch 6, the gas pipe 72 is divided into 2 pipes, in one pipe is provided a solenoid open-close valve 73 and a manual throttle valve 74, and in the other pipe is similarly provided a solenoid open-close valve 75 and a manual throttle valve 76. The aperture of the throttle valve 74 of one pipe is manually set beforehand on the basis of a flow value indicated by the gas flowmeter 71 so that a large flow is achieved in the hole-boring process shown in FIG. 6, and the aperture of the throttle valve 76 of the other pipe is manually set beforehand on the basis of a flow value indicated by the gas flowmeter 71 so that a small flow is achieved in the main welding process. And then, from an initial state, in which both open-close valves 73, 75 are closed, first, only the large flow pipe open-close valve 73 is opened in accordance with a command from the welding controller 14 shown in FIG. 2, and pre-flow commences, and open-close valve 73 is closed at the point in time when the hole-boring process ends, and the open-close valve 75 of the other pipe is opened at the same time, then open-close valve 75 is closed when after-flow ends.

This constitution of FIG. 7 has the advantage of being simple, but, on the other hand, has the following shortcomings. That is, because the throttle valve aperture changes over time, and contaminants precipitate inside the gas pipe, the apertures of the throttle valves 74, 76 must be adjusted from time to time, and to carry out this aperture adjustment, a person must go to the location of the torch 1. However, in general, when the torch 1 is mounted on a manufacturing line robot 10 as shown in FIG. 1, for safety reasons, a person is not able to approach a robot 10 while the manufacturing line is in operation. Consequently, an entire manufacturing line must be stopped from time to time for throttle valve adjustment. Further, an area flowmeter, which is generally used as a gas flowmeter 71, cannot be provided on a movable part such as a robot arm, and as shown in FIG. 7, the gas flowmeter 71 must be installed in a stable location distant from the throttle valves 74, 76 in the proximity of the torch 1. Consequently, throttle valve aperture adjustment is impossible without at least 2 persons.

Figure 8:
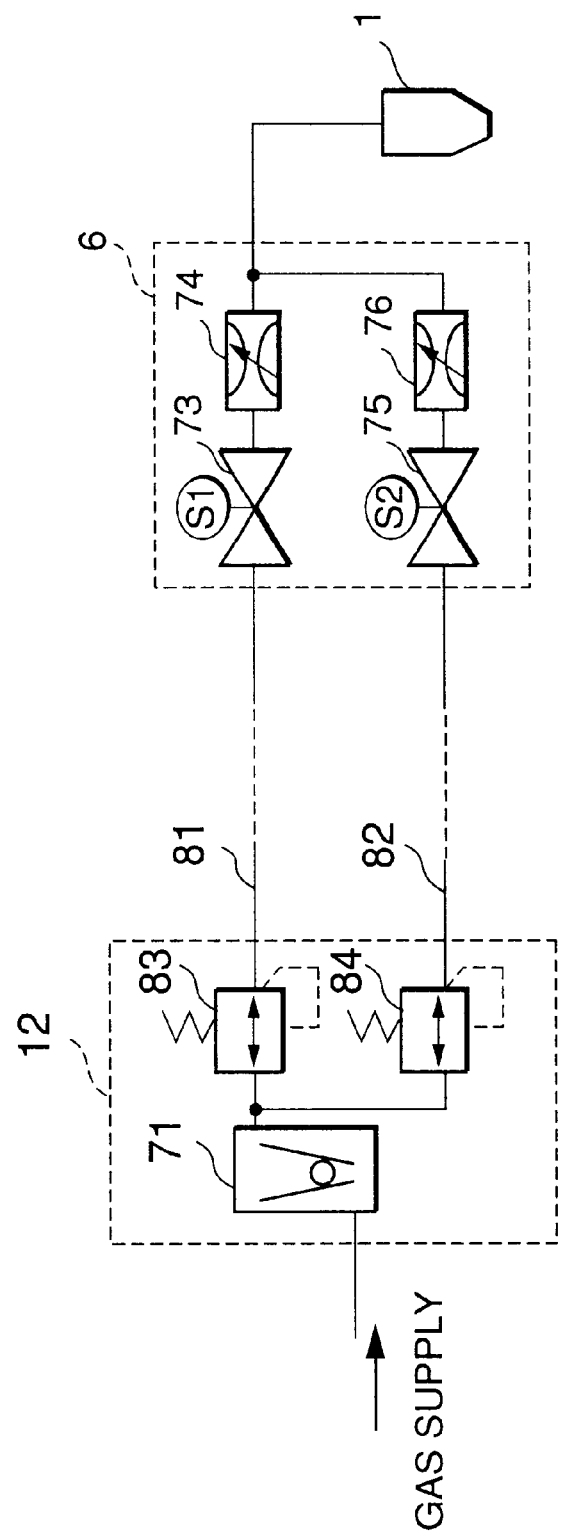
FIG. 8 is a piping diagram showing another example of a constitution for switching a gas flow.

FIG. 8 shows an example of another constitution, which improves this problem.

In a gas controller 12, a gas pipe is divided into 2 systems 81, 82 downstream of a gas flowmeter 71, and a pressure controller 83, 84 is disposed in each of the divided gas pipes 81, 82. The ends of the divided gas pipes 81, 82 are connected to two gas pipes inside a gas flow switch 6 in the proximity of a torch the same as in FIG. 7. The apertures of the throttle valves 74, 76 inside the gas flow switch 6 are set prior to assembly line operation using the method already described. After assembly line operation startup, a prescribed gas flow is maintained by adjusting from time to time the pressure controllers 83, 84 disposed in the proximity of the gas flowmeter 71, which is distant from the torch 1, without adjusting the throttle valves 74, 76.

Because the apertures of the throttle valves 74, 76 do not need to be precisely adjusted, an inexpensive, compact, fixed-aperture type throttle valve 74, 76 having an appropriate aperture can be used. Making the gas flow switch 6 smaller, and more lightweight in this manner is desirable from the perspective of heightening the maneuverability of the robot arm.

However, the examples of constitutions shown in FIGS. 7, 8 can be used for switching a shielding gas flow as well as for switching a plasma gas flow. That is, in the control methods shown in FIGS. 5, 6, a shielding gas flow is constant from beginning to end, but, as will be described below, to facilitate the measuring of a gap between steel sheets, there are times when it is desirable to make the shielding gas flow in the hole-boring process slightly less than same in the main welding process. In this case, the constitutions shown in FIGS. 7, 8 can also be utilized to switch the shielding gas flow.

Further, although not directly related to the present invention, by applying the same principle as the constitution shown in FIG. 8, it is also possible to achieve a constitution that can be utilized by supplying different gases to a plurality of gas pipes, and switching 2 or more kinds of gases at the torch.

Figure 9:
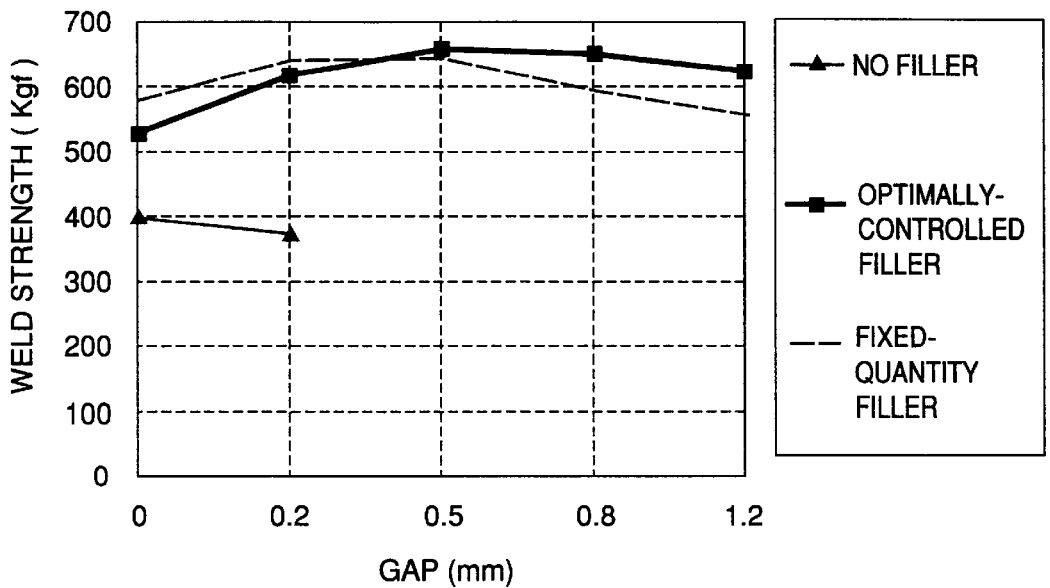
FIG. 9 is a diagram showing weld strengths achieved by testing a conventional welding method, and 2 types of welding methods according to the present invention.
Figure 10:
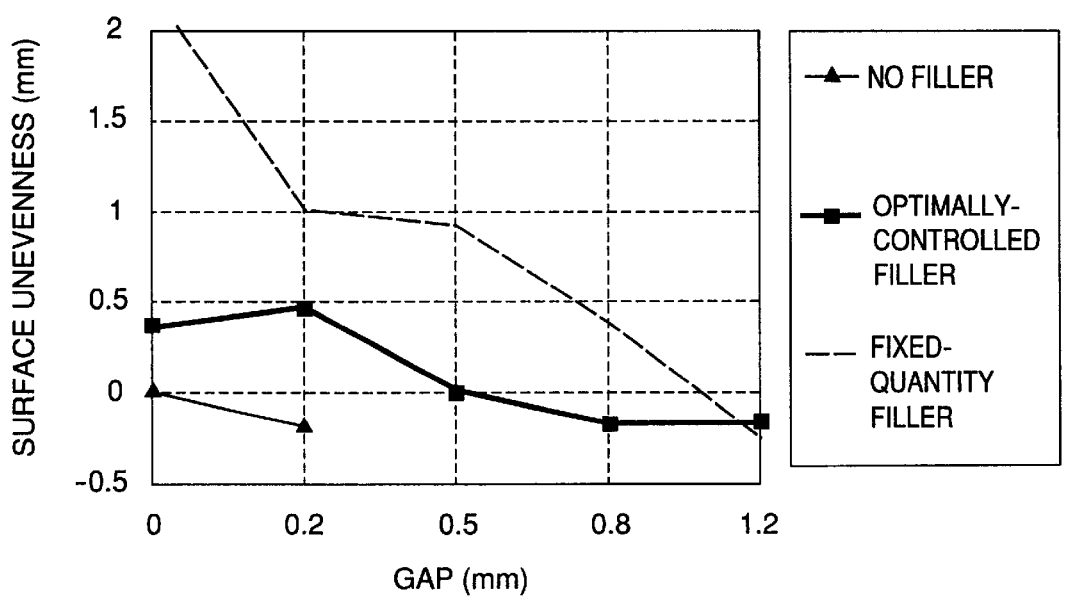
FIG. 10 is a diagram showing degrees of surface unevenness achieved by testing a conventional welding method, and 2 types of welding methods according to the present invention.

FIG. 9 and FIG. 10 show weld strengths and degrees of surface unevenness achieved by testing a conventional welding method, and 2 types of welding methods according to the present invention.

Figure 11:
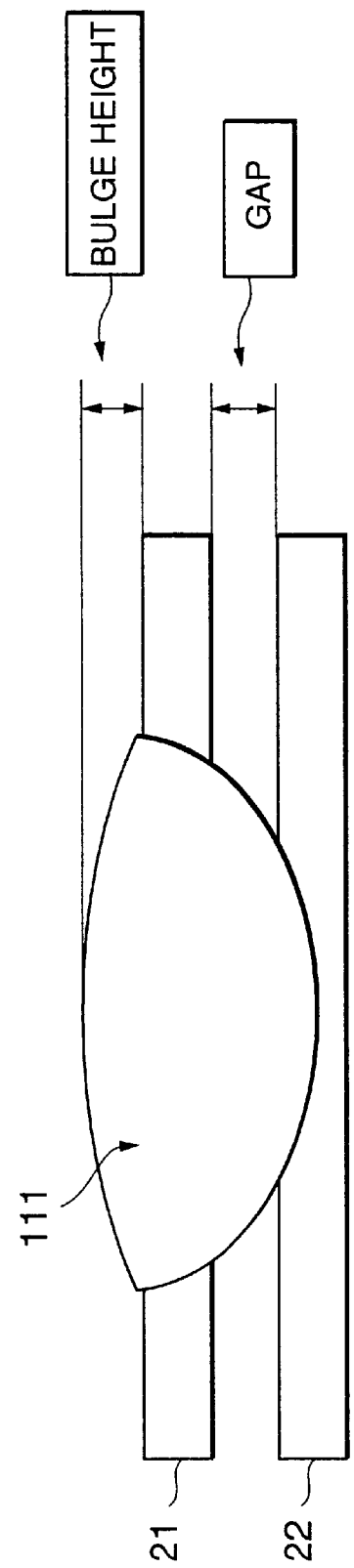
FIG. 11 is a diagram showing a shape of a weld.

Here, conventional welding method refers to the method of Japanese Patent Application No. 6-061138, in other words, to a method, wherein a main welding process is performed after a hole-boring process without supplying any filler, and the results of tests thereof are shown in the 'No Filler' graphs in the figures. The two types of welding methods according to the present invention were a method, wherein a main welding process is performed by supplying a fixed quantity of filler following a hole-boring process, and a method, wherein, following a hole-boring process, a main welding process is performed by supplying filler of a quantity, which is controlled in accordance with the size of a gap between the steel sheets. The results of tests of the former are shown as 'Fixed-Quantity Filler' graphs, and the results of the latter are given as 'Optimally-Controlled Filler' graphs. Further, the 'gap' represented by the horizontal axes of FIGS. 9, 10 is the size of the gap between an upper sheet 21 and a lower sheet 22, as shown in FIG. 11; the 'weld strength' represented by the vertical axis of FIG. 9 is the tensile strength obtained by conducting tensile tests of 1 weld formed between an upper sheet 21 and a lower sheet 22 via spot welding; and the 'surface unevenness' represented by the vertical axis of FIG. 10 is the height of the bulge of a weld 11 relative to the upper surface of an upper sheet 21, as shown in FIG. 11 (or the depth of the indentation from the upper surface of an upper sheet 21, when the weld 11 is concave). The specific conditions utilized in the tests are as shown hereinbelow.

TABLE 1

| | Filler Feed Quantity (m) | |
|---|---|---|
| Gap Size (mm) | Fixed-Quantity Filler | Optimally-Controlled Filler |
| 0 | 57 | 11 |
| 0.2 | 57 | 30 |
| 0.5 | 57 | 36 |
| 0.8 | 57 | 52 |
| 1.2 | 57 | 65 |

The upper sheet was a 0.8 mm thick galvanized steel sheet, the lower sheet was a 1.8-mm thick SPHC steel sheet, welding current was constant at 45A, plasma gas and assist gas comprised argon +7% hydrogen, and the plasma gas flow was 6 liters/min at the hole-boring process, and 2 liters/min at the main welding process. Filler diameter was φ1.2 mm, and with regard to filler feed quantity, a fixed quantity of a length of 57 mm was supplied for 'Fixed-Quantity Filler,' and for 'Optimally-Controlled Filler,' the filler feed quantity was changed in accordance with gap size, as shown in Table 1.

As can be seen from FIG. 9, with the conventional 'No Filler' method, when the gap exceeded 0.2 mm, the vapor escape hole could not be filled, and welding itself could not be performed, and even when the gap was less than 0.2 mm, tensile strength was relatively low. By contrast thereto, with the 'Fixed-Quantity Filler' method of the present invention, the hole could be filled and welding could be performed even when the gap was 1.2 mm, and tensile strength was stable at a relatively high value across a wide range of gaps from 0–1.2 mm. With the 'Optimally-Controlled Filler' method of the present invention, highly stable tensile strength on a par with that of the 'Fixed-Quantity Filler' method was achieved. With regard to the degree of surface unevenness, as can be seen from FIG. 10, according to the 'Optimally-Controlled Filler' method of the present invention, it was possible to make the weld surface effectively flatter than with the other 2 methods, regardless of the size of the gap.

In the 'Optimally-Controlled Filler' method of the present invention, it is necessary to measure the gap size. For this gap measurement, two types of methods are described hereinbelow. A first method is one in which gap size is determined from a plasma arc voltage value at the point in time when a hole-boring process is complete, and a second method is one in which gap size is determined from a temporal change gradient of a plasma arc voltage during a hole-boring process. A description of the first method will be given first.

Figure 12:
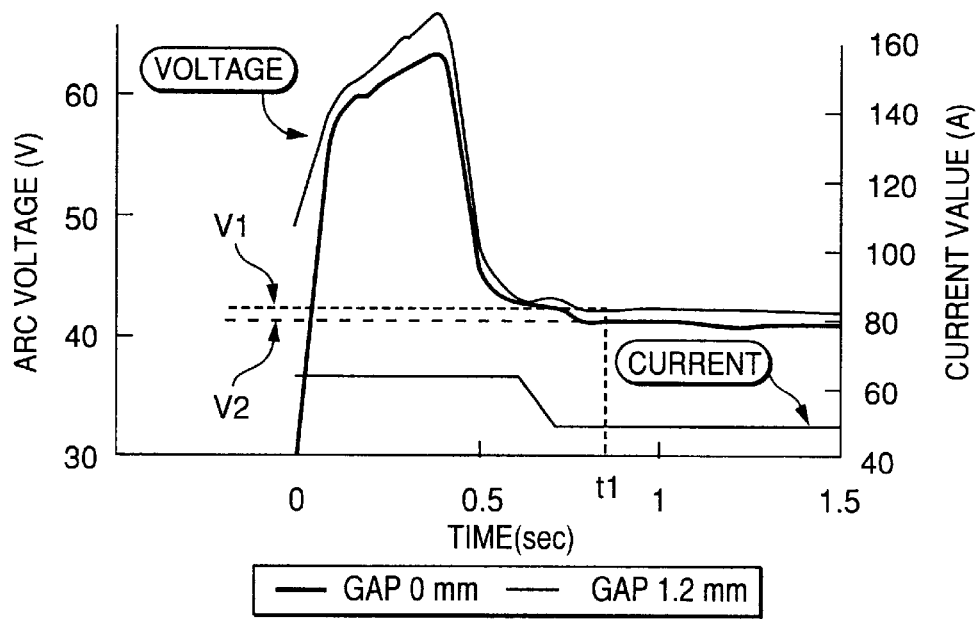
FIG. 12 is a waveform diagram showing changes in plasma arc current and voltage when performing the control method shown in FIG. 5.
Figure 13:
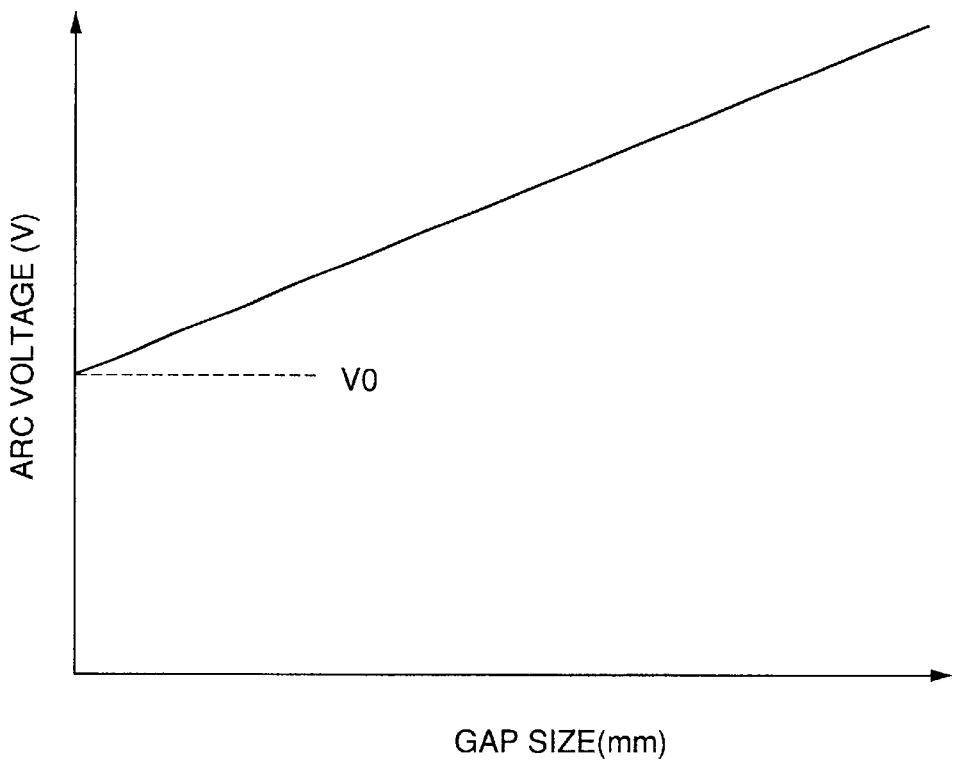
FIG. 13 is a diagram showing the relationship between gap size and arc voltage.

FIG. 12 shows changes in plasma arc current and voltage when carrying out a control method like that shown in FIG. 5 (measured under conditions of a shielding gas flow of 6 liters/min). In the control method of FIG. 5, as already explained, arc current is controlled at a relatively high constant value during a hole-boring process, reduced to a relatively low value when the hole-boring process is complete, and controlled at the constant low value thereof in a main welding process of subsequent thereto. The current waveform of FIG. 12 shows this kind of arc current change, and the voltage waveform shows a change in arc voltage at the time thereof. As shown in the figure, when a hole-boring process is complete, the arc voltage drops, and at the point in time t1 (in the example of FIG. 12, between 0.8–0.85 seconds after the start of a hole-boring process), and is statically stabilized at practically a constant value, and this statically stabilized arc voltage exhibits a different value V1, V2 in accordance with gap size. That is, the larger the gap size, the higher the value exhibited. The reason therefor is presumed to be because the larger the gap size, the farther away from the torch 1 the lower sheet 22 becomes, resulting in a longer plasma arc column and an increased drop in voltage. FIG. 13 shows the relationship, in brief, between gap size and the statically stabilized arc voltage thereof. Arc voltage, having a certain offset value V0, is practically proportional to gap size. Therefore, the relationship between gap size and arc voltage shown in FIG. 13 (in reality, the relationship between an arc voltage and a filler feed quantity (feed time) corresponding to a gap size) is stored, for example, in the format of a look-up table inside the welding controller 14 shown in FIG. 2, and the arc voltage is measured for each welding operation at the point in time t1 when a hole-boring process is complete (for example, an average value is found by sampling arc voltage every 0.001 seconds at time intervals of between 0.8–0.85 seconds from the start of a hole-boring process), and by using the measured value thereof, it is possible to determine the gap size (in reality, the filler feed quantity (feed time) corresponding to the gap size) by addressing the look-up table.

Figure 14:
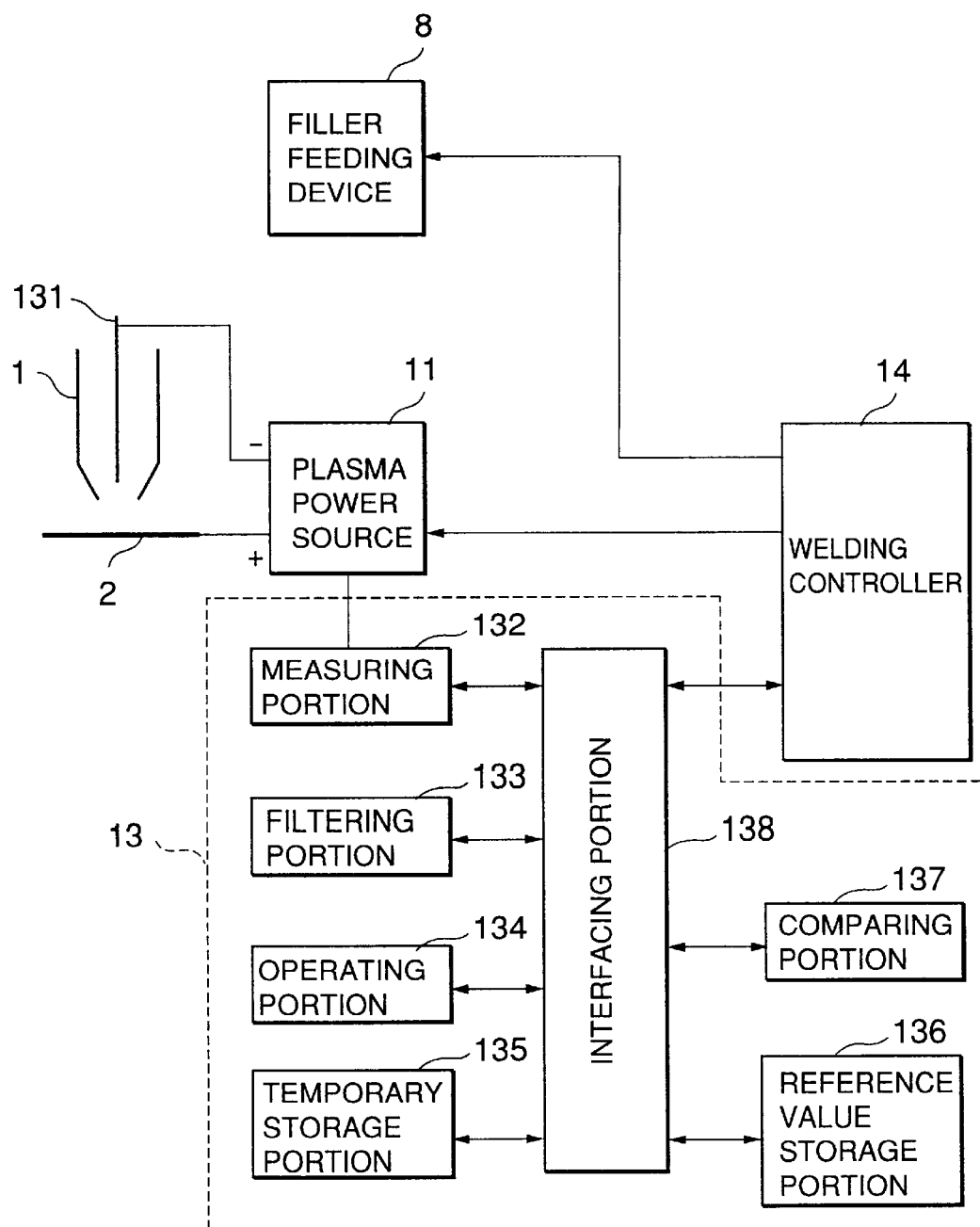
FIG. 14 is a block diagram showing a constitution of a gap determining device 13 for implementing a gap size measuring method.

FIG. 14 shows a constitution of a gap determining device 13 for implementing this gap size measuring method.

The gap determining device 13 has a measuring portion 132, a filtering portion 133, an operating portion 134, a temporary storage portion 135, a reference value storage portion 136, and a comparing portion 137, these elements are capable of communicating with one another via an interfacing portion 138, and can also communicate with the welding controller 14. The measuring portion 132 samples the arc voltage generated by the plasma power source 11 between 0.8–0.85 seconds after the start of a hole-boring process. The filtering portion 133 subjects the sampled arc voltage sampled value to a filtering process, and removes noise components. The operating portion 134 computes an average value from a series of sampled values obtained at measuring intervals. The temporary storage portion 135 temporarily stores a series of sampled values and an average value. The reference value storage portion 136 stores the above-mentioned look-up table. The comparing portion 137 uses an average value to determine a filler feed time corresponding to a gap size by addressing the look-up table, and to also determine the time of a main welding process in accordance with the filler feed time, and notifies the welding controller 14 of these determined welding conditions. The welding controller 14, in accordance with a determined filler feed time and main welding process time, controls the filler feeding device 8 and plasma power source 11 during a main welding process.

Figure 15:
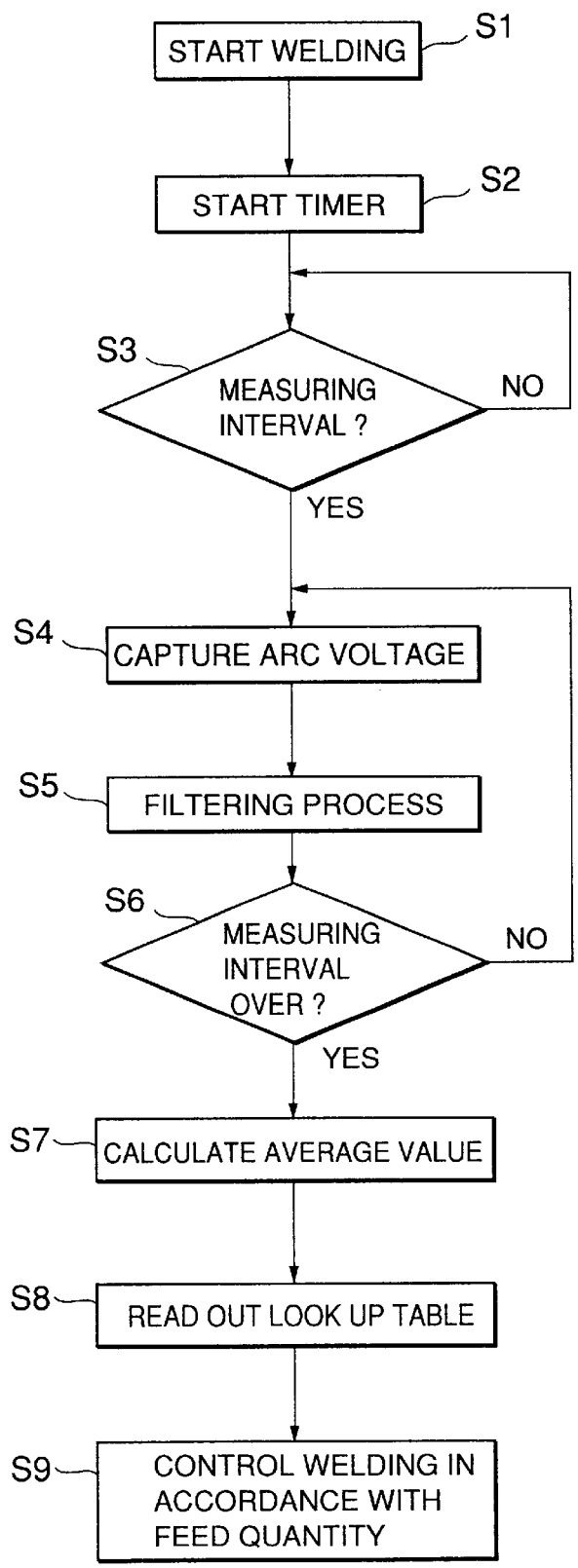
FIG. 15 is a flowchart showing an operation performed by the gap determining device 13 of FIG. 14.

FIG. 15 shows the flow of operations performed by the gap determining device 13 of FIG. 14.

First, simultaneous to the start of welding (S1), a timer is started (S2), and as the timer indicates the measuring intervals (0.8–0.85 seconds from the start of a hole-boring process) (S3), arc voltage is sampled at 0.001 second intervals (S4), a sampled value is subjected to a filtering process (S5), and stored in the temporary storage portion 135. When the measuring interval ends (S6), an average value of all the sampled values is calculated (S7), and this average value is used to read out a filler feed quantity from a look-up table (S8). At table readout, a filler feed quantity is read out from an address corresponding to the arc voltage value in the table, which is closest to the average value. And then, in accordance with the read out filler feed quantity, welding conditions of a main welding process are selected (S9), and notified to the welding controller 14.

This first gap size measuring method is not limited only to the control method shown in FIG. 5, but rather, can also be applied to the control method shown in FIG. 6. In the control method of FIG. 6 as well, arc voltage is measured at time intervals at which arc voltage has just been statically stabilized following the end of a hole-boring process.

The problem with this first gap size measuring method is that when the electrode 131 inside the torch 1 shown in FIG. 14 is worn down as the number of welding operations increases, the initially set look-up table must be revised, and a measurement cannot be taken when the torch 1 standoff (distance from a workpiece) differs for each workpiece. This is because the offset voltage V0 shown in FIG. 13 changes in accordance with the distance between the tip of the electrode 131 inside the torch 1 and the surface of a workpiece 2.

Figure 16:
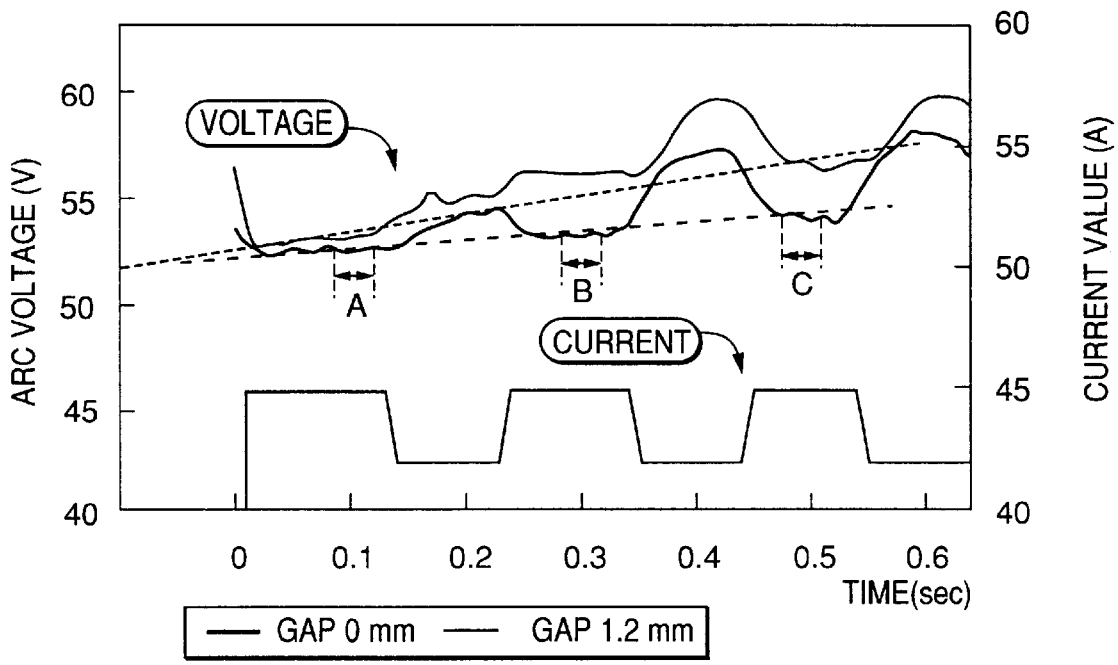
FIG. 16 is a waveform diagram showing the relationship between arc current and arc voltage for explaining the principle of a second gap size measuring method.
Figure 17:
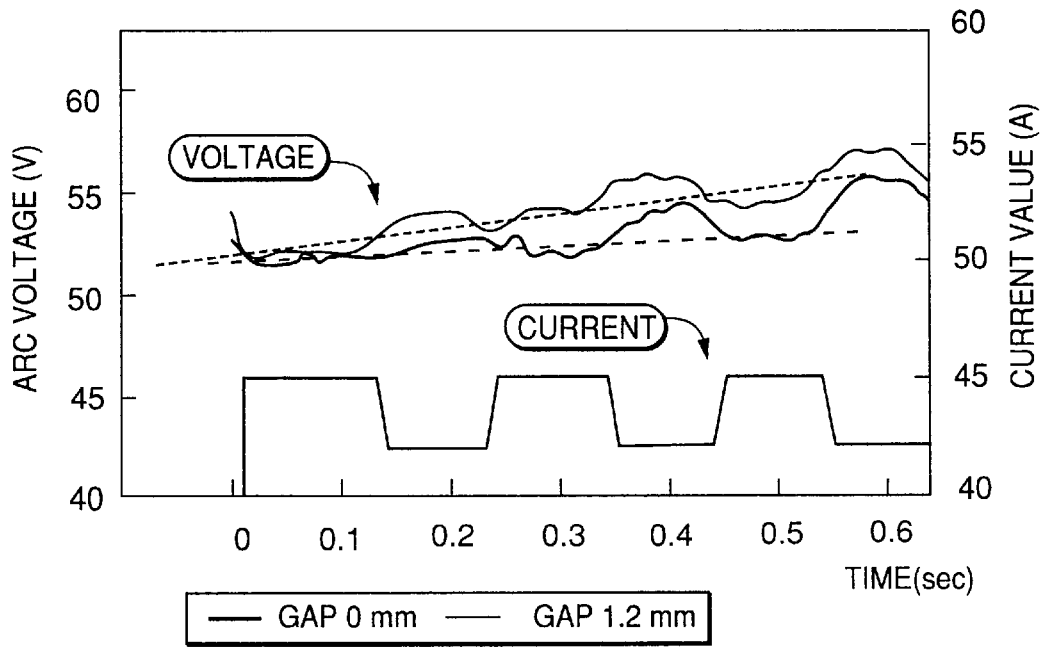
FIG. 17 is a waveform diagram showing the relationship between arc current and arc voltage for explaining the principle of a second gap size measuring method.

The second gap size measuring method solves for this problem. FIG. 16 and FIG. 17 show the relationship between arc current and arc voltage for explaining the principle of this second method.

In either of the cases shown in FIG. 16 and FIG. 17, an arc current is switched back-and-forth between a large current value and a small current value a plurality of times. In other words, a plurality of arc current rectangular pulses having large current values are made to flow repeatedly. Here, the large current value possessed by this arc current pulse is a current value capable of boring a hole in a steel sheet with certainty, like the arc current value of the hole-boring process shown in FIG. 6, and conversely, the small arc current value of pulse quiescent time between pulses is an arc current value that is lower than the current value used in the main welding process of FIG. 6, and cannot bore a hole in a steel sheet.

Figure 18:
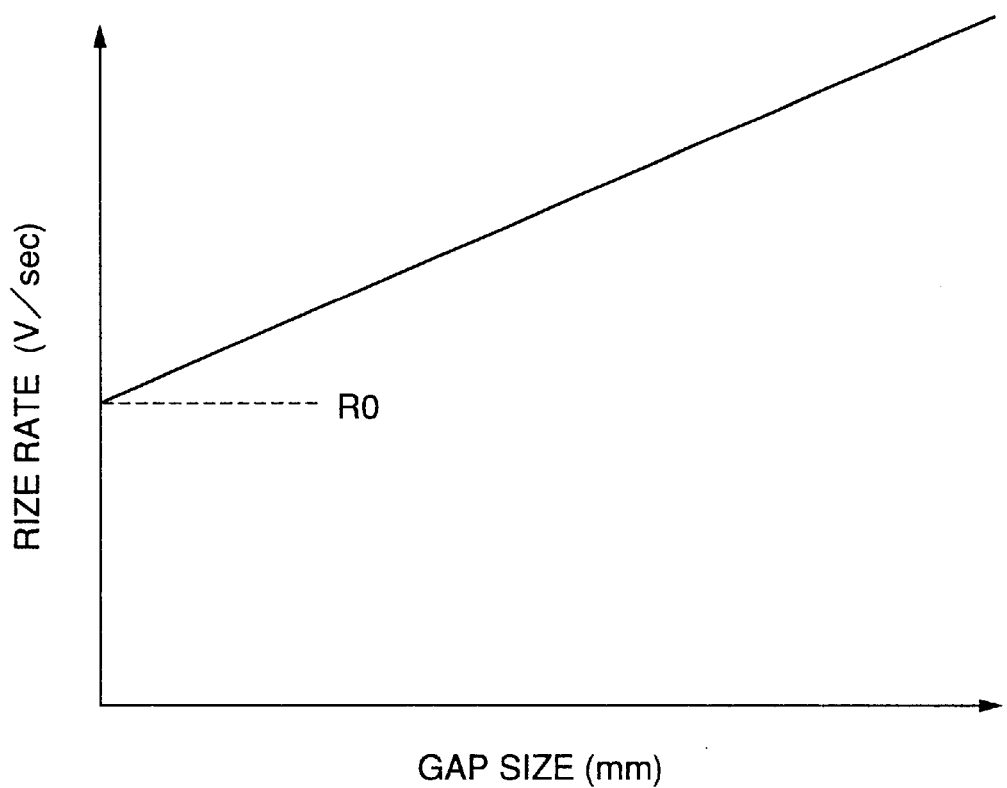
FIG. 18 is a diagram showing the relationship between gap size and arc voltage rise rate.

As is clear from FIG. 16 and FIG. 17, arc voltage at an arc current pulse exhibits a lower value than arc voltage at pulse quiescent time, but the low arc voltage thereof rises linearly as the number of arc current pulses increases. Accordingly, when gap size differs (for example, between a gap size of 0 mm and a gap size of 1.2 mm), if the linear rise of arc voltage during a series of arc current pulses is determined as with the dotted lines in the figures, it is clear that the gradient of the linear rise (in other words, the rise rate of the arc voltage) differs in accordance with the gap size. A relationship such as that shown in FIG. 18 is generally seen between the size of a gap and the arc voltage rise rate. That is, the arc voltage rise rate when an arc current pulse is made to flow, having a certain offset rise rate R0, changes practically proportionally to the gap size. The characteristics shown in this FIG. 18 are stable, and are hardly affected at all by electrode wear, and changes in torch standoff.

Further, FIG. 16 shows a case when shielding gas flow is set at 4 liters/min, and FIG. 17 shows a case when shielding gas flow is set at 10 liters/min, but as can be seen by comparing the two figures, in the case of FIG. 16, when the shielding gas flow is smaller, the difference of the arc voltage rise rate in accordance with the gap size is manifested more prominently.

Figure 19:
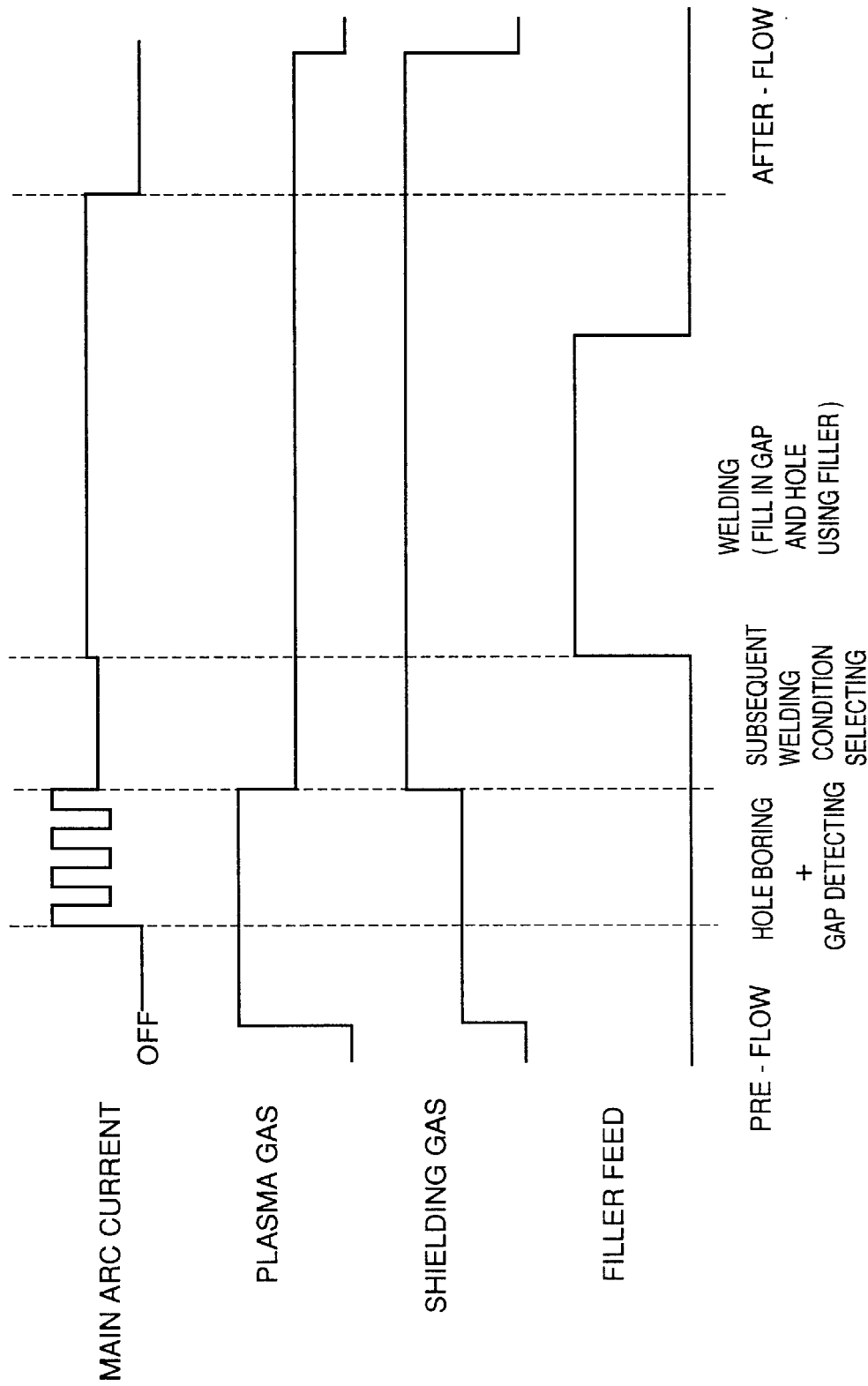
FIG. 19 is a timing chart showing a control method for carrying out a second gap size measuring method.

To carry out the second measuring method by making use of the above-facts, a control method like that shown in FIG. 19 is utilized.

In the control method of FIG. 19, an arc current pulse like that described above is made to flow in a hole-boring process, and when the hole-boring process ends, there is performed a process in which a gap size (in reality, a filler feed quantity that accords with a gap size) is determined, and welding conditions are selected, during which time, the arc current is made slightly lower than an appropriate welding value, and subsequent thereto, the arc current is set at an appropriate welding value, and a main welding process is performed. Further, a plasma gas flow can be an appropriate welding value from beginning to end just like the method of FIG. 5, but controlling the arc current to a large value until a hole-boring process ends, and then restoring it to an appropriate welding value after the hole-boring process as shown in FIG. 19 (in other words, like the control method of FIG. 6) is desirable for enabling highspeed hole-boring, and furthermore, the difference of the arc voltage rise rate according to the gap size becomes more prominent. Further, the shielding gas flow is set at a value that is slightly smaller than the appropriate value until a hole-boring process ends, and returns to an appropriate value after the hole-boring process. As for the small shielding gas flow in a hole-boring process, it is essential that the shielding gas flow be set appropriately so as not to be so small as to give rise to the problem of oxidation of a weld. Filler feed is performed during a main welding process only for a time that accords with a filler feed quantity determined in a welding condition selecting process.

The second gap size measuring method can be implemented by a gap determining device 13 of the constitution shown in FIG. 14. In the case thereof, the measuring portion 132 samples an arc voltage when an arc current pulse is being made to flow during a hole-boring process. For example, if using an arc current pulse of the waveform shown in FIG. 16, an arc voltage is sampled, for example, at a 0.001 second interval in three time intervals A, B, C of, for example, 0.04 seconds in duration, centering around the three points in time of 0.1 second, 0.3 seconds, 0.5 seconds, respectively, from the start of a hole-boring process. Further, the operating portion 134 performs a linear regression computation using one hundred and twenty arc voltage sampled values, and the gradient thereof, that is, the arc voltage rise rate is determined from the obtained regression line (in other words, the dotted line of FIG. 16). In the reference value storage portion 136 is stored a look-up table showing the correspondence between an arc voltage rise rate and a gap size (in reality, a filler feed quantity (feed time) corresponding to a gap size). The comparing portion 137 uses the computed arc voltage rise rate to acquire a filler feed quantity (feed time) corresponding to a gap size by addressing the look-up table, and sends this filler feed quantity (feed time) to the controlling portion 138.

Figure 20:
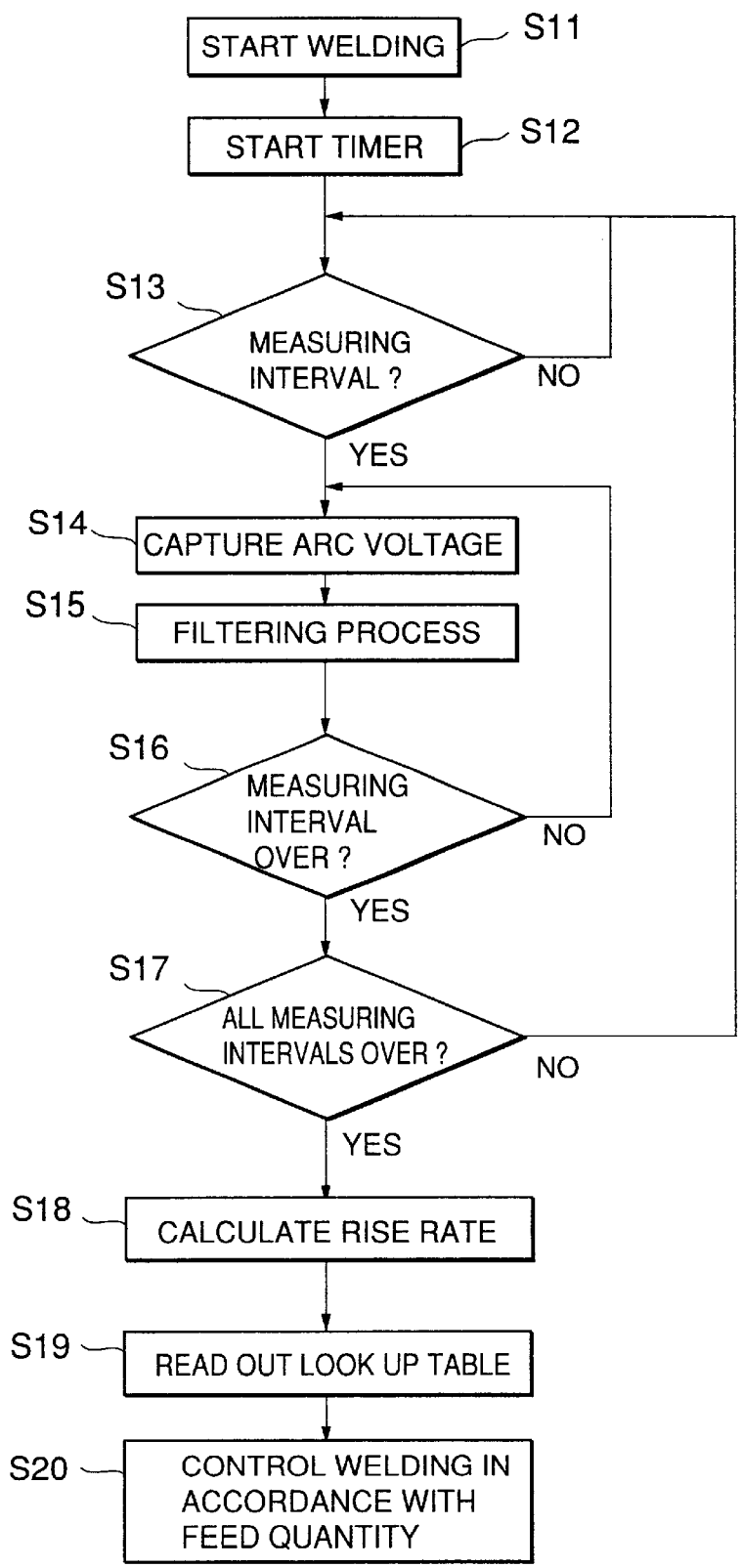
FIG. 20 is a flowchart showing an operation of the gap determining device 13 when carrying out a second gap size measuring method.

FIG. 20 shows the operation of the gap determining device 13 when performing the second gap size measuring method.

First, simultaneous to the start of welding (S11), a timer is started (S12), and as the timer indicates the measuring intervals (at time intervals of 0.04 second duration centering, respectively, around points in time of 0.1 second, 0.3 seconds, 0.5 seconds from the start of a hole-boring process) (S13), arc voltage is sampled at 0.001 second intervals (S14), a sampled value is subjected to a filtering process (S15), and this sampled value is stored in the temporary storage portion 135. When this process has been performed for the three measuring intervals (S16), and all measuring intervals have ended (S17), an arc voltage rise rate is determined by performing a linear regression computation using all sampled values (S18). And then, this arc voltage rise rate is used to read out a filler feed quantity corresponding to a gap size by addressing a look-up table (S19), and in accordance with the read out filler feed quantity, welding conditions of a main welding process are selected (S20), and notified to the welding controller 14.

Figure 21:
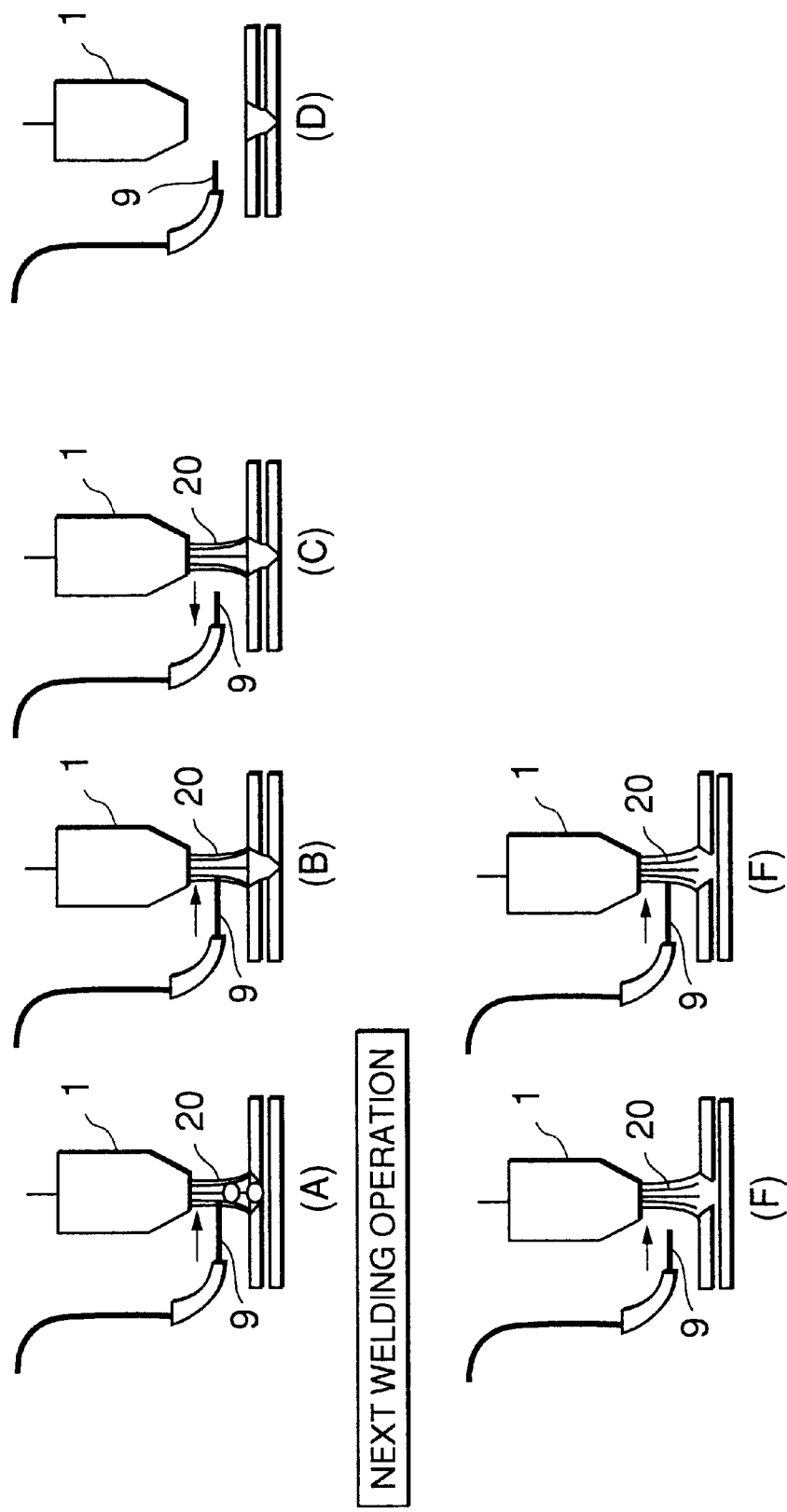
FIG. 21 is a schematic diagram showing an operation for supplying a filler.

An appropriate filler feed quantity (filler feed time) that accords with a gap size can be determined by either one of the two methods explained above. As can be seen from FIG. 10, when a gap approaches 0, carrying out welding with no filler makes it possible to reduce the roughness of the surface. Accordingly, when a gap determining result is 0, or in the vicinity of 0, welding can be carried out without supplying filler, and conditions can be set so that filler is supplied only when a gap is larger. Then, an operation for supplying filler can be carried out as shown in FIG. 21.

First, a main welding process is started by feeding filler 9 into a plasma arc 20 at a constant rate ((A) in the figure), filler feed is halted at the point in time when a specified filler feed time has elapsed ((B) in the figure), and the filler 9 is immediately retracted outside the plasma arc ((C) in the figure) (When performing this retraction operation, there are times when the end portion of the filler 9 is deformed by the arc heat, droops down and adheres to the workpiece.). At the point in time when the specified main welding process time has elapsed, the plasma arc is shut down, and the main welding process ends ((D) in the figure). In the next welding operation, at the point in time when the hole-boring process is complete, filler feed of a constant rate is started ((E) in the figure), and during the time it takes for the tip of the filler 9 to reach the plasma arc 20, gap size measuring and welding condition selecting processes are performed, and the main welding process commences from the point in time when the filler tip reaches the plasma arc 20 ((F) in the figure).

Figure 22:
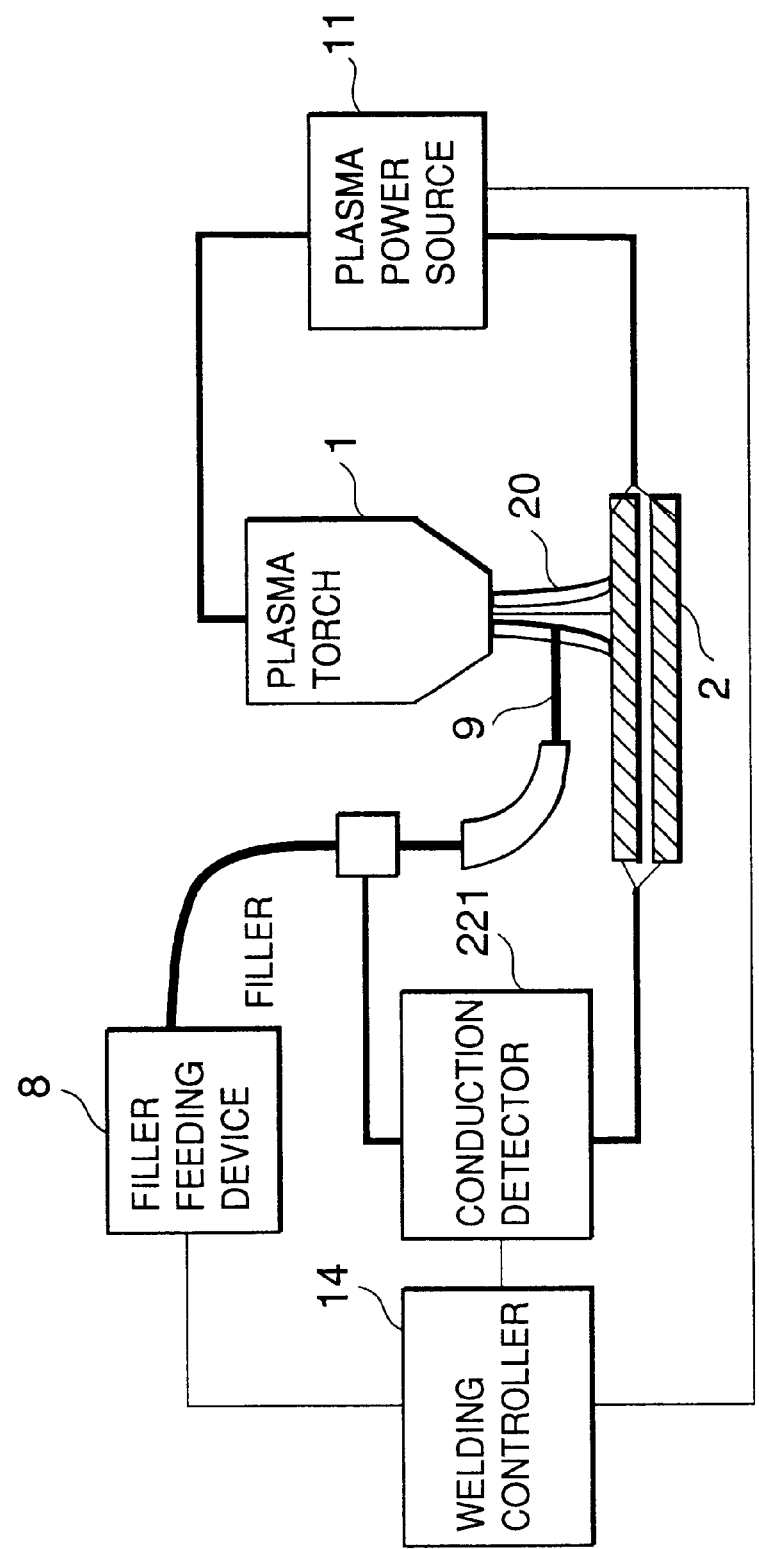
FIG. 22 is a block diagram showing a constitution for performing the filler feed of FIG. 21.

FIG. 22 shows a constitution for carrying out this kind of filler feed operation.

A conduction detecting device 221 is connected to a filler 9 and work 2, detects whether or not there is electrical conductivity between the filler 9 and the work 2, and notifies the results thereof to the welding controller 14. When a hole-boring process ends, the welding controller 14 instructs the plasma power source 11 to reduce the plasma current, and simultaneously instructs the filler feeding device 8 to start filler feed, and subsequent thereto, waits for the output of the conduction detecting device 22 to change to conductive. Further, in the time it takes for the output of the conduction detecting device 22 to change to conductive, the gap determining device 13 measures the size of the gap, and notifies the welding controller 14 of the welding condition of a main welding process. Thereafter, when the output of the conduction detecting device 22 changes to conductive (in other words, when the tip of the filler 9 reaches the plasma arc 20), the welding controller 14 instructs the plasma power source 11 to control the plasma current to an appropriate welding value, and a main welding process starts. When a prescribed filler feed time has elapsed following the start of a main welding process, the welding controller 14 instructs the filler feeding device 8 to stop filler feed, and to retract the filler 9. Since the output of the conduction detecting device 22 changes to non-conductive when the filler tip is retracted outside of the plasma arc 20, thereafter, the welding controller 14 shuts down the filler feeding device 8 after delaying no more than the time required for the tip of the filler 9 to separate at least an appropriate distance from the plasma arc 20. Further, at the point in time when a prescribed main welding process time has elapsed from the start of a main welding process, the welding controller 14 shuts down the plasma arc 20 by sending instructions to the plasma power source 11.

The preferred embodiments of the present invention have been explained above, but needless to say, the present invention is not limited to these embodiment, and can be implemented in various other modes as well. For example, control patterns of the arc current, gas flows, and filler feed shown as examples in FIGS. 5, 6, 19 can also be employed, and further, not only filler feed quantity, but also other welding conditions (for example, arc current, arc voltage, plasma gas flow, plasma gas type, shielding gas flow, shielding gas type, standoff, and so forth) can be optimally controlled in accordance with gap size. One example thereof will be provided hereinbelow.

Figure 23:
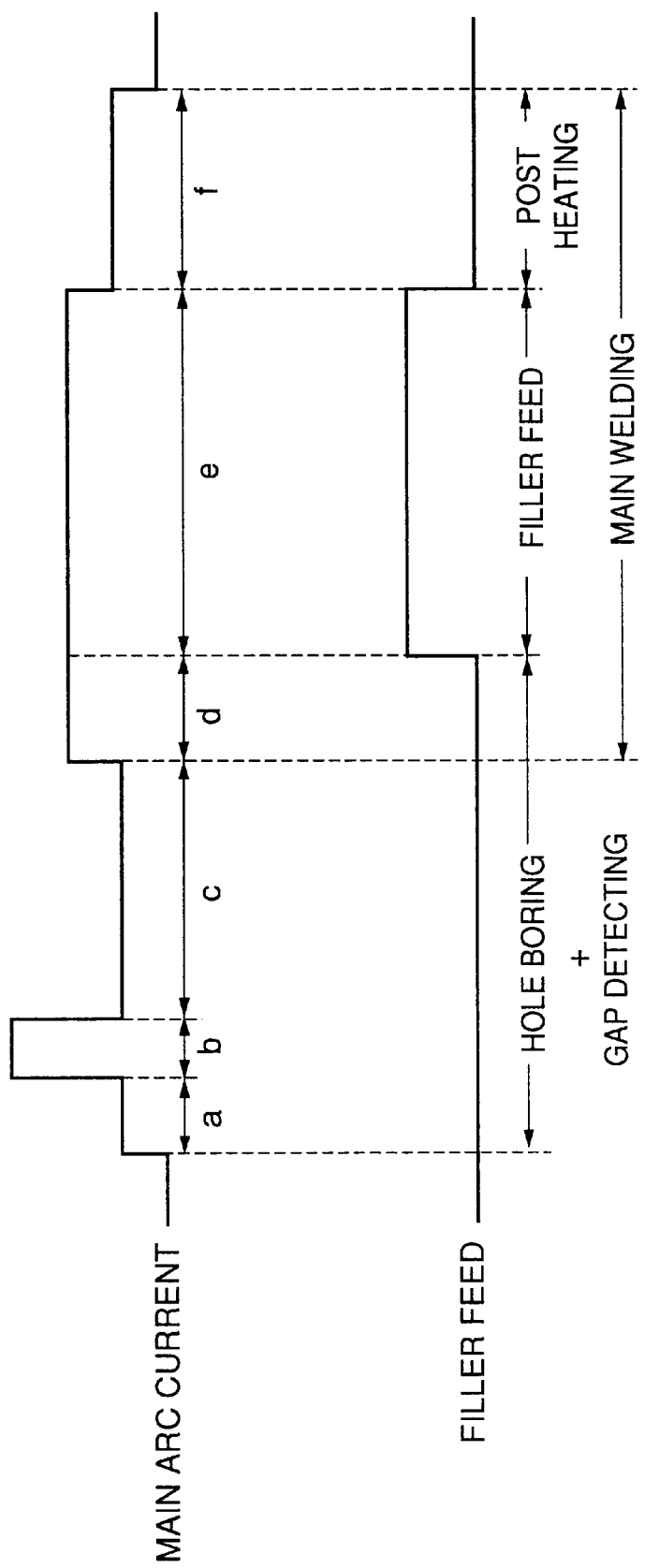
FIG. 23 is a timing chart showing an example of another control method.

As shown in FIG. 23, hole-boring and gap-detecting processes comprise the four intervals of a, b, c, d, the main arc current is controlled to an especially high value in interval b thereamong, and hole-boring is mainly carried out during this interval b. Further, gap detecting (including welding condition selecting) is mainly carried out from interval c through interval d following completion of hole-boring. The main welding process is started substantially from interval d, and the main arc current is controlled to a value appropriate to welding in this interval d and the subsequent interval e, and further, filler feed is carried out in interval e following the selecting of welding conditions. The arc current value in intervals d, e, and the filler feed rate in interval e are controlled to optimal values that accord with gap size. In the final interval f, filler feed is stopped, the arc current is controlled to a relatively low value, and a post-heating process is carried out to smooth finish the surface by making the molten pool filled with filler and the surrounding steel sheet conform nicely.

Table 2 shows specific examples of welding conditions, which accord with gap sizes in each interval of FIG. 23. Furthermore, the following examples assume a case in which a 0.8 mm-thick galvanized steel upper sheet is welded to a 0.8 mm-thick SPHC steel lower sheet.

In the examples shown in this Table 2, as gap size becomes larger, the filler feed rate is raised, the filler feed quantity is increased, and the plasma arc power is raised by also increasing the arc current value in intervals d, e. Furthermore, in the examples of Table 2, the following conditions are not dependent on gap size, and can be fixed, for example, as follows. That is, the plasma gas is argon plus 7% hydrogen, and the flow is 2 liters/min, and the shielding gas is argon plus 7% hydrogen, and the flow is 6 liters/min, and standoff is 6.5 mm.

TABLE 2

| Gap Size (mm) | Welding Conditions | Hole-boring + Gap Detecting Process | | | | Filler Feed Process | Post Heating |
| --- | --- | --- | --- | --- | --- | --- | --- |
| | | a | b | c | d | e | f |
| 0 | Current Value (A) | 32 | 120 | 32 | | 42 | 32 |
| | Time (sec) | 0.2 | 0.2 | 1.5 | 0.7 | 1.3 | 1.0 |
| | Filler Feed Quantity (mm) | | .......... | | | 8 | .... |
| | Filler Feed time (sec) | | .......... | | | 1.3 | .... |
| 0.5 | Current Value (A) | Same conditions as gap 0 | | | | 46 | Same conditions as gap 0 |
| | Time (sec) | Same conditions as gap 0 | | | 0.7 | 1.3 | Same conditions as gap 0 |
| | Filler Feed Quantity (mm) | | .......... | | | 30 | .... |
| | Filler Feed time (sec) | | .......... | | | 1.3 | .... |
| 1.2 | Current Value (A) | Same conditions as gap 0 | | | | 49 | Same conditions as gap 0 |
| | Time (sec) | Same conditions as gap 0 | | | 0.7 | 1.3 | Same conditons as gap 0 |
| | Filler Feed Quantity (mm) | | .......... | | | 51 | .... |
| | Filler Feed time (sec) | | .......... | | | 1.3 | .... |

What is claimed is:

1. A plasma spot welding apparatus for spot welding work which has a plurality of welding materials put on top of each other, comprising:

controlling device for controlling a plasma arc so as to perform a hole-boring process for boring a hole in said work, and, subsequent thereto, to perform a main welding process for welding said work; and filler feeding device for supplying a filler to said plasma arc at least when said main welding process is being performed.

2. The plasma spot welding apparatus according to claim 1, wherein said hole bored by said hole-boring process passes through at least one of a plurality of welding materials of said work.

3. The plasma spot welding apparatus according to claim 1, wherein said hole bored by said hole-boring process passes through all of a plurality of welding materials of said work.

4. The plasma spot welding apparatus according to claim 1, wherein said filler feeding device supplies said filler only when said main welding process is being performed.

5. The plasma spot welding apparatus according to claim 1 or 4, wherein said filler feeding device supplies said filler in accordance with either a previously-determined feed quantity or feed time.

6. The plasma spot welding apparatus according to claim 1 or 4, further comprising:
   welding condition determining device for determining a welding condition of said main welding process in accordance with the size of a gap possessed by said work.

7. The plasma spot welding apparatus according to claim 6, wherein said welding condition determining device performs processing for determining said welding condition in parallel with said hole-boring process.

8. The plasma spot welding apparatus according to claim 6, wherein said welding condition determining device measures a plasma arc voltage value when said hole-boring process has ended, and determines a welding condition, which accords with said gap size, on the basis of the measured plasma arc voltage value.

9. The plasma spot welding apparatus according to claim 6, wherein said welding condition determining device measures a rise rate of a plasma arc voltage during said hole-boring process, and determines a welding condition, which accords with said gap size, on the basis of the measured rise rate.

10. The plasma spot welding apparatus according to claim 9, wherein said arc controlling device makes a plurality of arc current pulses flow repeatedly during said hole-boring process.

11. The plasma spot welding apparatus according to claim 10, wherein said arc controlling device controls a shielding gas flow in said hole-boring process so that it is smaller than same in said main welding process.

12. The plasma spot welding apparatus according to claim 9, wherein said arc controlling device controls a shielding gas flow in said hole-boring process so that it is smaller than same in said main welding process.

13. A plasma spot welding method for spot welding work which has a plurality of welding materials put on top of each other, comprising the steps of:
   (a) boring a hole in said work using a plasma arc;
   (b) welding said work using a plasma arc following said hole-boring step; and
   (c) supplying a filler to said plasma arc at least when said main welding step is being performed.

14. The plasma spot welding method according to claim 12, wherein step (c) is performed only when step (b) is performed.

15. The plasma spot welding method according to claim 12 or 13, further comprising the step of:
   determining a welding condition of step (b) in accordance with the size of a gap possessed by said work.

16. A plasma spot welding apparatus for spot welding work which has a plurality of welding materials put on top of each other, comprising:
   feed quantity determining device for determining either a feed quantity or a feed time of a filler in accordance with the size of a gap possessed by said work;
   arc generating device for generating a plasma arc; and
   filler feeding device for supplying said filler to said plasma arc in accordance with either a feed quantity or a feed time determined by said feed quantity determining device.

17. A plasma spot welding method for spot welding work which has a plurality of welding materials put on top of each other, comprising the steps of:
   determining either a feed quantity or a feed time of a filler in accordance with the size of a gap possessed by said work;
   generating a plasma arc; and
   supplying said filler to said plasma arc in accordance with either a feed quantity or a feed time determined by said feed quantity determining device.

18. A plasma spot welding apparatus for spot welding work which has a plurality of welding materials out on top of each other, comprising:
   arc generating device for generating a plasma arc for boring a hole in said work; and
   feed quantity determining device for determining either a filler feed quantity or feed time, which accords with the size of a gap possessed by said work, for filling in said hole with filler.

19. A plasma spot welding method for spot welding work which has a plurality of welding materials put on top of each other, comprising the steps of:
   generating a plasma arc for boring a hole in said work; and
   determining either a filler feed quantity or feed time, which accords with the size of a gap possessed by said work, for filling in said hole with filler.

20. A control device for plasma spot welding work which has a plurality of welding materials Put on top of each other, comprising:
   measuring device for measuring a state of a plasma arc being used to bore a hole in said work; and
   welding condition determining device for determining a welding condition for welding said work based on an output of said measuring device.

21. A control method of plasma spot welding work which has a plurality of welding materials put on top of each other comprising the steps of:
   measuring a state of a plasma arc being used to bore a hole in said work; and
   determining a welding condition for welding said work based on a result of said measuring step.

22. A robot mounted with a plasma spot welding apparatus for spot welding work which has a plurality of welding materials put on top of each other, comprising:
   controlling device for controlling a plasma arc so as to perform a hole-boring process for boring a hole in said work, and subsequent thereto, to perform a main welding process for welding said work; and
   filler feeding device for supplying a filler to said plasma arc at least when said main welding process is being performed.

23. A plasma arc welding apparatus, comprising:
   device for measuring, during welding, a physical value related to the size of a gap possessed by work;
   device for determining, during welding, a filler feeding condition, which accords with said gap size, on the basis of a measurement value from said measuring device;

device for supplying, during welding, a filler to a plasma arc; and device for changing a welding condition at each of the times when measuring said physical value, when determining said filler feeding condition, and when supplying said filler.

24. A plasma arc welding method, comprising the steps of:

measuring, during welding, a physical value related to the size of a gap possessed by work;

determining, during welding, a filler feeding condition, which accords with said gap size, on the basis of a measurement value from said measuring device;

supplying, during welding, a filler to a plasma arc; and changing a welding condition at each step of measuring said physical value, determining said filler feeding condition, and supplying said filler.

25. A gap detecting device, comprising:

a measuring portion for measuring an arc voltage of a plasma arc when said plasma arc is being supplied to work so as to bore a hole in said work; and a determining portion for determining either the size of a gap possessed by said work, or related data corresponding to said gap size on the basis of a change in said arc voltage measured by said measuring portion.

26. The gap size determining device according to claim 25, wherein said change is a rise rate.

27. The gap detecting device according to claim 25, wherein said plasma arc is supplied in a mode of a repeated plurality of current pulses having a prescribed current value.

28. The gap detecting device according to claim 27, wherein said change is a change in said arc voltage corresponding to said plurality of current pulses.

29. The gap detecting device according to claim 25, further comprising:

a gas controller for controlling the flow of a shielding gas supplied to said plasma arc, said gas controller controlling the flow of said shielding gas, when said measuring portion is measuring said arc voltage, to a smaller value than a predetermined shielding gas flow for when welding said work.

30. The gap detecting device according to claim 25, wherein said related data is a welding condition relative to said plasma arc welding apparatus for welding said work.

31. A gap detecting method, comprising the steps of:

measuring an arc voltage of a plasma arc when said plasma arc is being supplied to work so as to bore a hole in said work; and determining either the size of a gap possessed by said work, or related data corresponding to said gap size on the basis of a change in said arc voltage measured by said measuring portion.

32. A computer readable storage media, which supports a program for implementing on a computer a gap detecting method, comprising the steps of:

measuring an arc voltage of a plasma arc when said plasma arc is being supplied to work so as to bore a hole in said work; and determining either the size of a gap possessed by said work, or related data corresponding to said gap size on the basis of a change in said arc voltage measured by said measuring portion.

33. A plasma arc welding apparatus, comprising:

an arc generating device for generating a plasma arc for welding work;

filler feeding device for supplying a filler to said plasma arc; and a gap detecting device for measuring a physical value related to the size of a gap between said work, said filler feeding device stopping the supply of said filler when the output of said gap detecting device signifies that said gap size is substantially zero.

* * * * *